(12) United States Patent
Amaral et al.

(10) Patent No.: US 11,493,441 B2
(45) Date of Patent: Nov. 8, 2022

(54) FLOW CELL, READ HEAD, AND SKID ATTACHMENT

(71) Applicant: Wyatt Technology Corporation, Goleta, CA (US)

(72) Inventors: Drew Amaral, Santa Margarita, CA (US); Vincent Hsieh, Santa Barbara, CA (US)

(73) Assignee: WYATT TECHNOLOGY CORPORATION, Goleta, CA (US)

( * ) Notice: Subject to any disclaimer, the term of this patent is extended or adjusted under 35 U.S.C. 154(b) by 173 days.

(21) Appl. No.: 16/744,172

(22) Filed: Jan. 15, 2020

(65) Prior Publication Data

US 2020/0225155 A1 Jul. 16, 2020

Related U.S. Application Data

(60) Provisional application No. 62/792,403, filed on Jan. 15, 2019.

(51) Int. Cl.
*G01N 21/51* (2006.01)
*G01N 21/05* (2006.01)
*G01N 21/53* (2006.01)

(52) U.S. Cl.
CPC ............ *G01N 21/51* (2013.01); *G01N 21/05* (2013.01); *G01N 21/53* (2013.01); *G01N 2021/513* (2013.01)

(58) Field of Classification Search
CPC .. G01N 2021/513; G01N 21/05; G01N 21/51; G01N 21/53; G01N 2021/4711
USPC ........................................................ 356/246
See application file for complete search history.

(56) References Cited

U.S. PATENT DOCUMENTS

| 5,938,982 A * | 8/1999 | Sugiura | B01F 25/53 366/339 |
| 2002/0171836 A1* | 11/2002 | Gerner | G01N 21/05 356/440 |
| 2008/0289427 A1* | 11/2008 | Brandt | G01H 9/008 73/643 |
| 2014/0266266 A1* | 9/2014 | Baigar | G01N 27/08 356/337 |

(Continued)

FOREIGN PATENT DOCUMENTS

| DE | 102016125043 A1 * | 4/2017 | |
| GB | 2462606 * | 2/2010 | G01N 21/7703 |

OTHER PUBLICATIONS

Technical product catalog 2016 by EVAC AG (Year: 2016).*

*Primary Examiner* — Sunghee Y Gray
(74) *Attorney, Agent, or Firm* — Leonard T. Guzman

(57) ABSTRACT

The present disclosure describes a flow cell, a read head, and a skid attachment for measuring real-time molecular weight for downstream process control. In an embodiment, the flow cell comprises a hollow cylindrical tube, an inlet flange connected to an inlet of the tube, and an outlet flange connected to an outlet of the tube. In an embodiment, the read head comprises at least one push rod, at least two line contacts, where the at least one push rod is configured to push an outer side wall of a flow cell against the at least two line contacts. In an embodiment, the skid attachment comprises a plurality of arms connected to an enclosure configured to house at least a multi-angle light scattering instrument comprising a read head.

10 Claims, 29 Drawing Sheets

(56) References Cited

U.S. PATENT DOCUMENTS

2016/0091365 A1* 3/2016 DiCesare .............. G02B 6/262
250/428

* cited by examiner

DETAIL C

1

FLOW CELL, READ HEAD, AND SKID ATTACHMENT

BACKGROUND

The present disclosure relates to multi-angle light scattering, and more specifically, to a flow cell, a read head, and a skid attachment for measuring real-time molecular weight for downstream process control.

SUMMARY

The present disclosure describes a flow cell, a read head, and a skid attachment for measuring real-time molecular weight for downstream process control. In an exemplary embodiment, the flow cell comprises (1) a hollow cylindrical tube, (2) an inlet flange connected to an inlet of the tube, and (3) an outlet flange connected to an outlet of the tube. In an exemplary embodiment, the read head comprises (1) at least one push rod, (2) at least two line contacts, where the at least one push rod is configured to push an outer side wall of a flow cell against the at least two line contacts, thereby registering the flow cell within the read head. In an exemplary embodiment, the skid attachment comprises a plurality of arms connected to an enclosure configured to house at least a multi-angle light scattering instrument comprising a read head, where the enclosure is configured to be connected to a skid via the plurality of arms, where the skid is configured to house chemical processing equipment.

DETAILED DESCRIPTION

Figure 1:
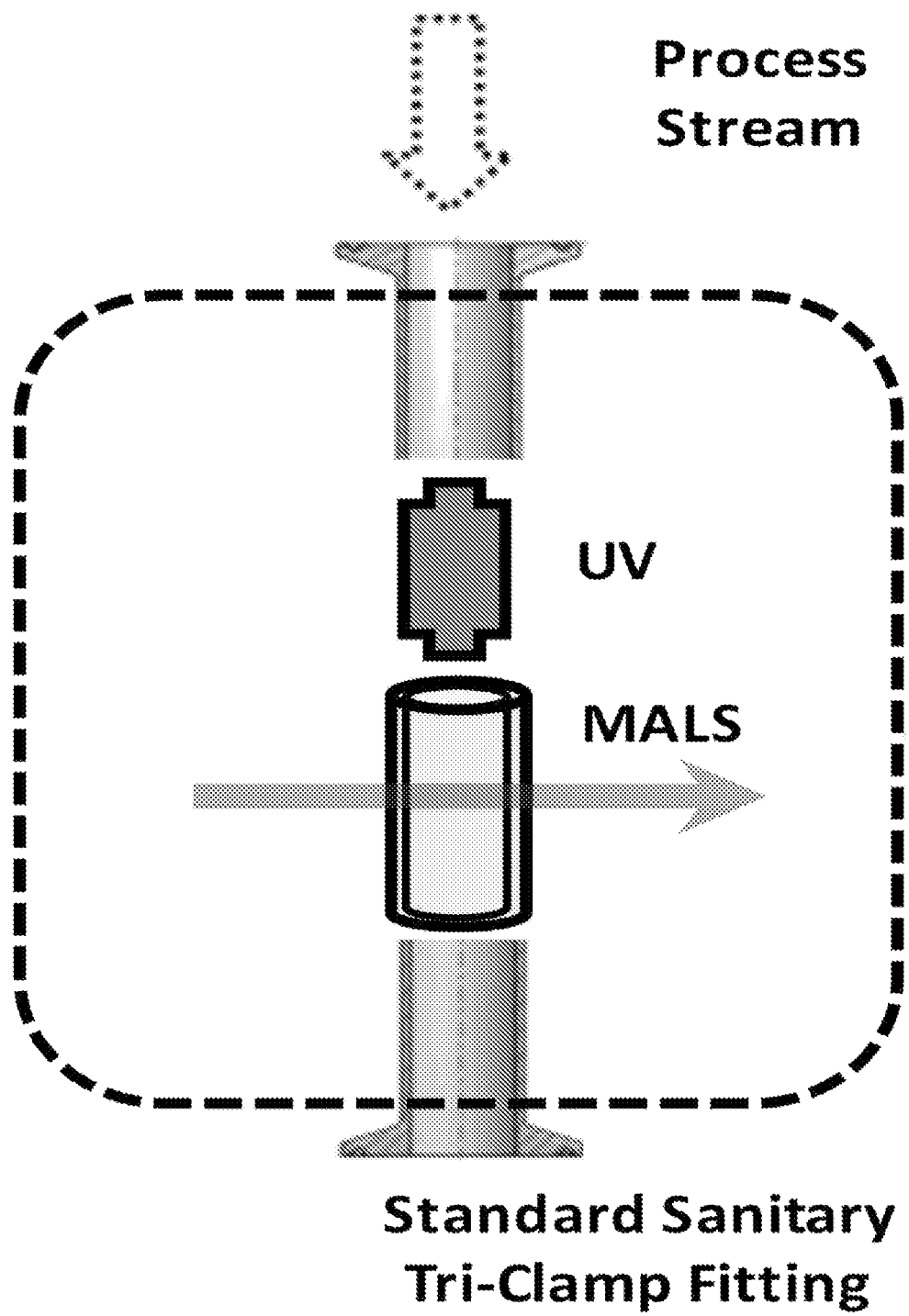
FIG. 1 depicts a block diagram in accordance with an exemplary embodiment.
Figure 2A:
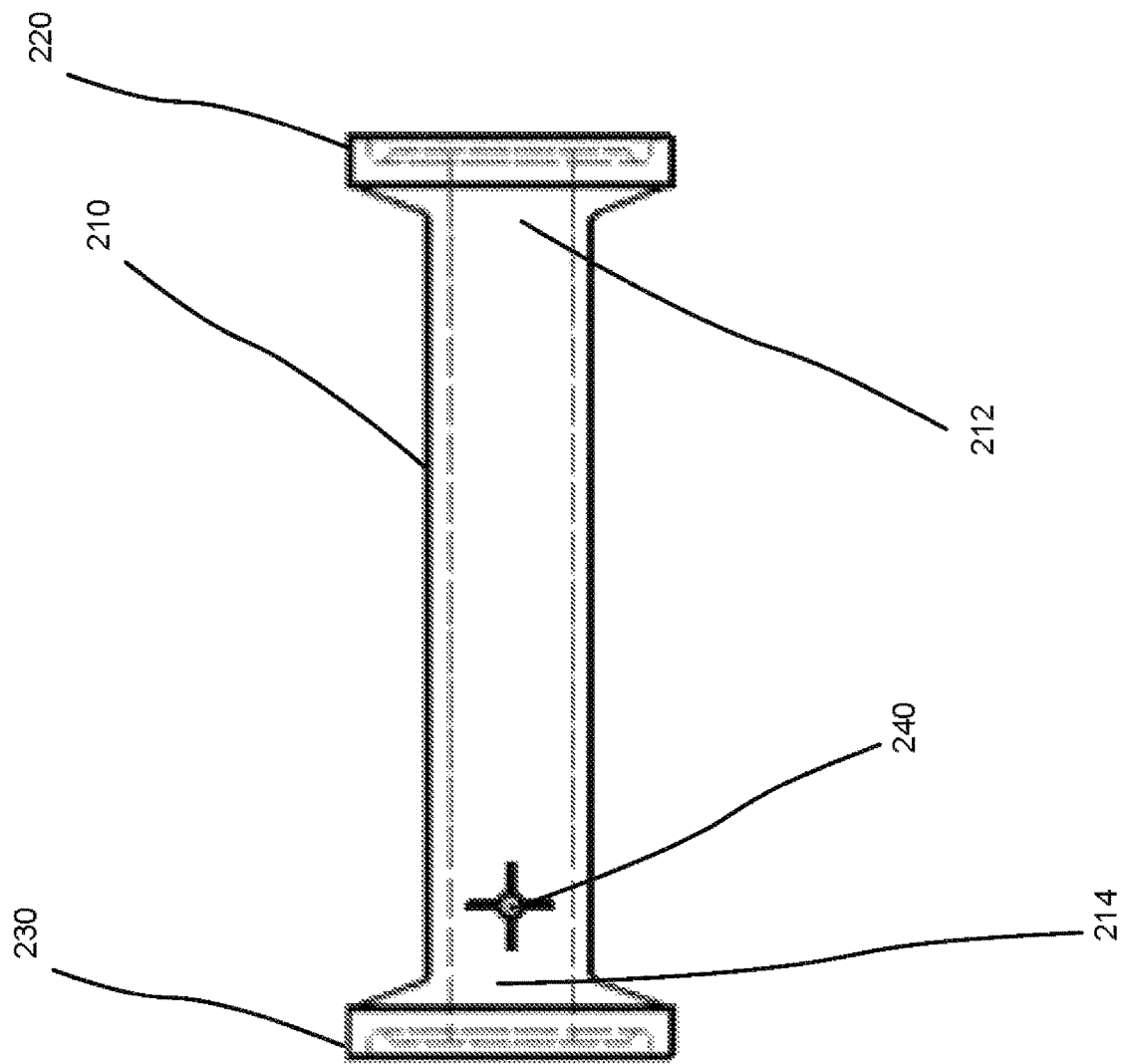
FIG. 2A depicts a flow cell in accordance with an exemplary embodiment.
Figure 2B:
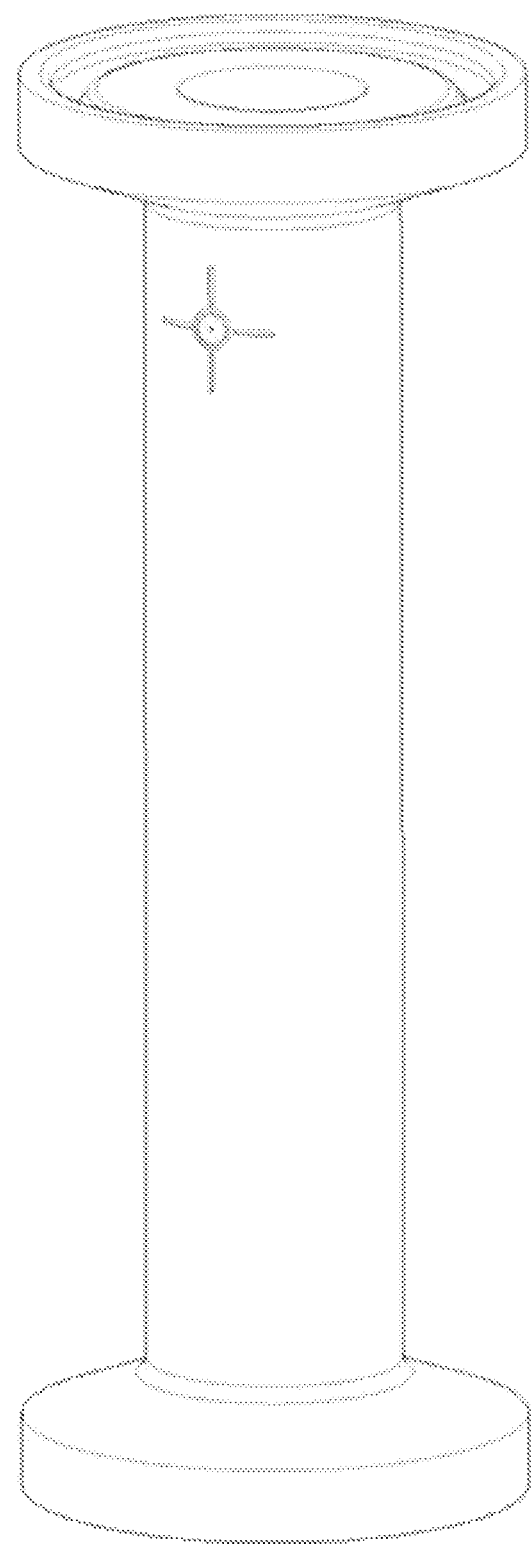
FIG. 2B depicts a flow cell in accordance with an exemplary embodiment.
Figure 2C:
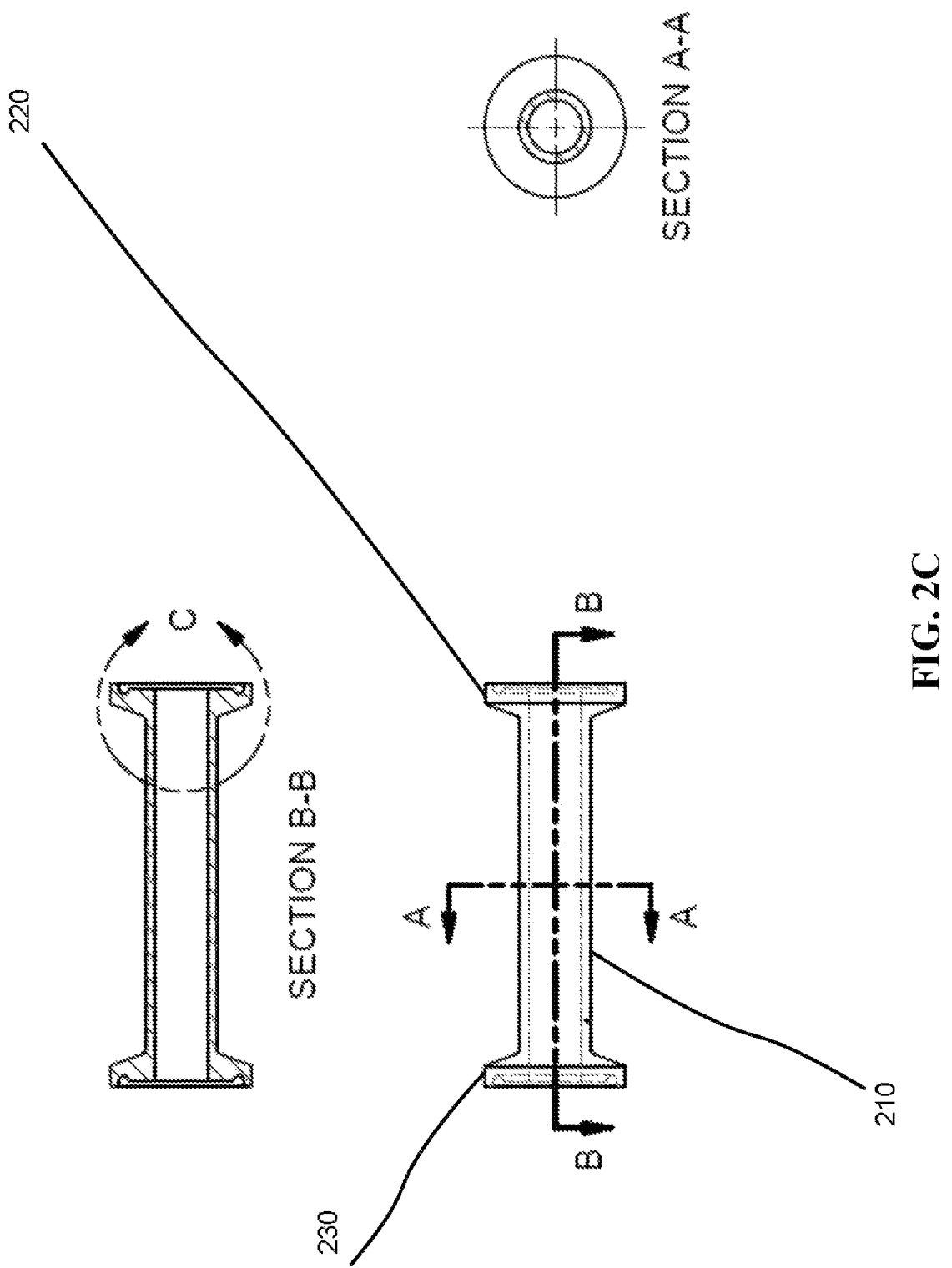
FIG. 2C depicts a flow cell in accordance with an exemplary embodiment.
Figure 2D:
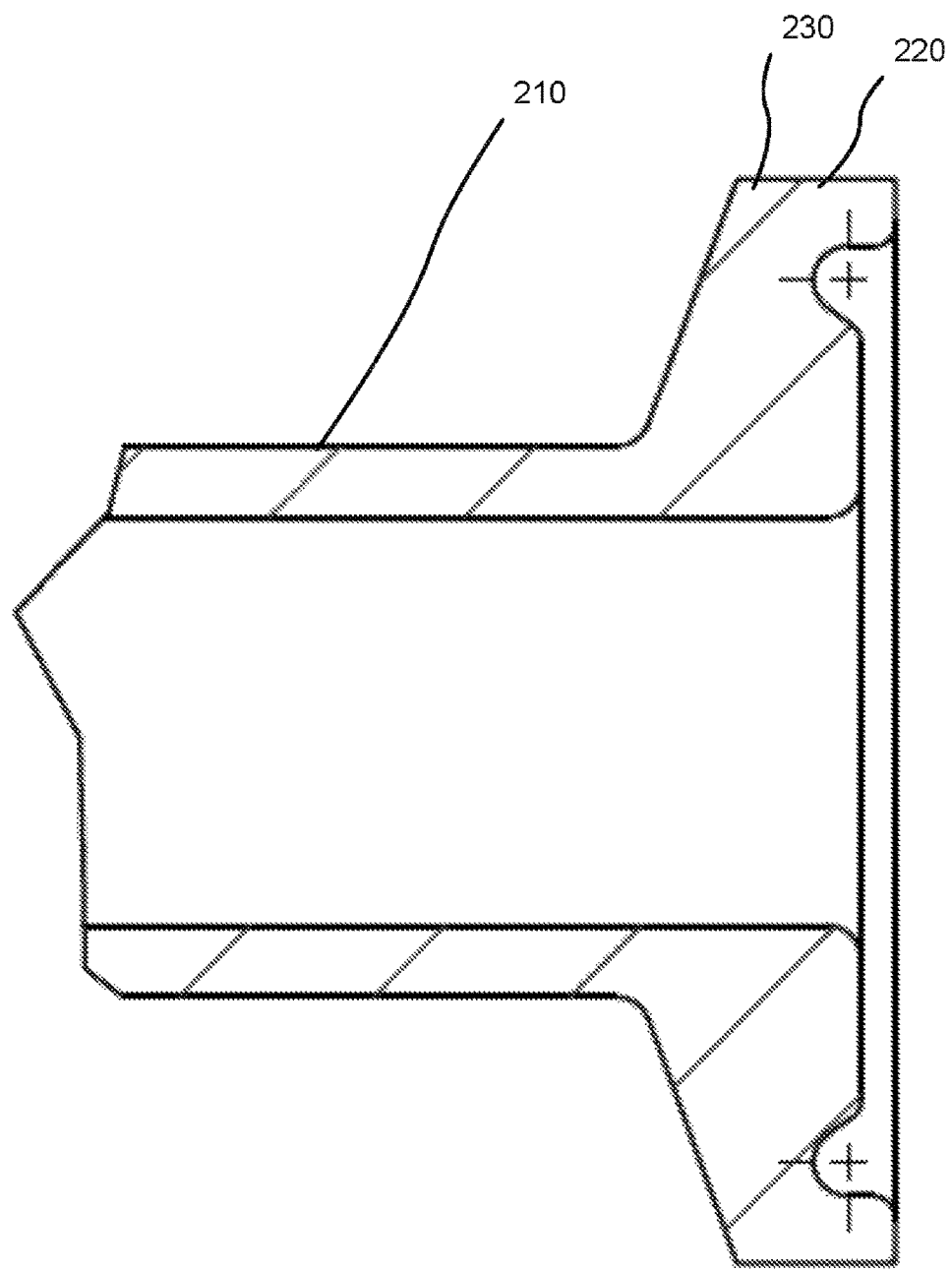
FIG. 2D depicts a flow cell in accordance with an exemplary embodiment.
Figure 2E:
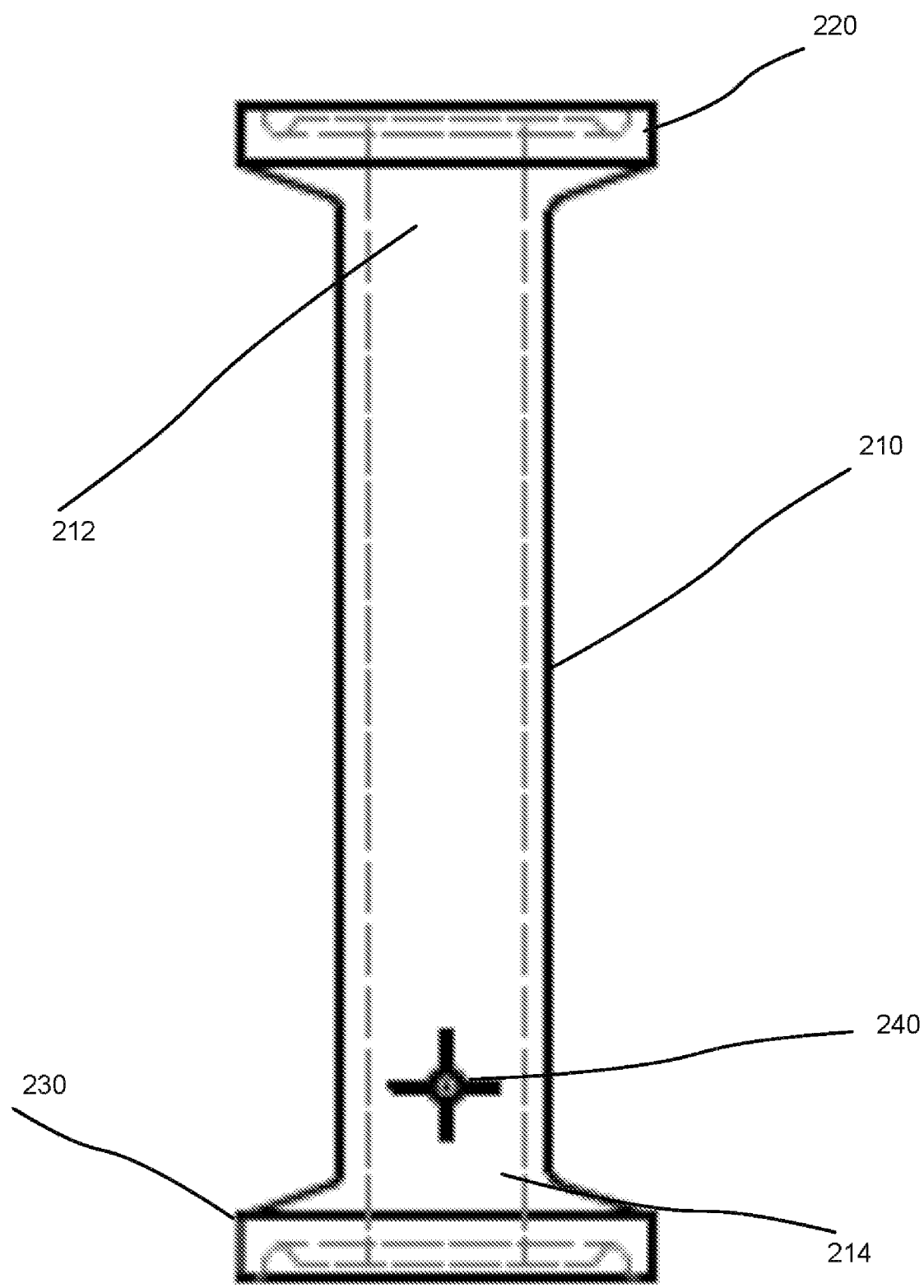
FIG. 2E depicts a flow cell in accordance with an exemplary embodiment.
Figure 2F:
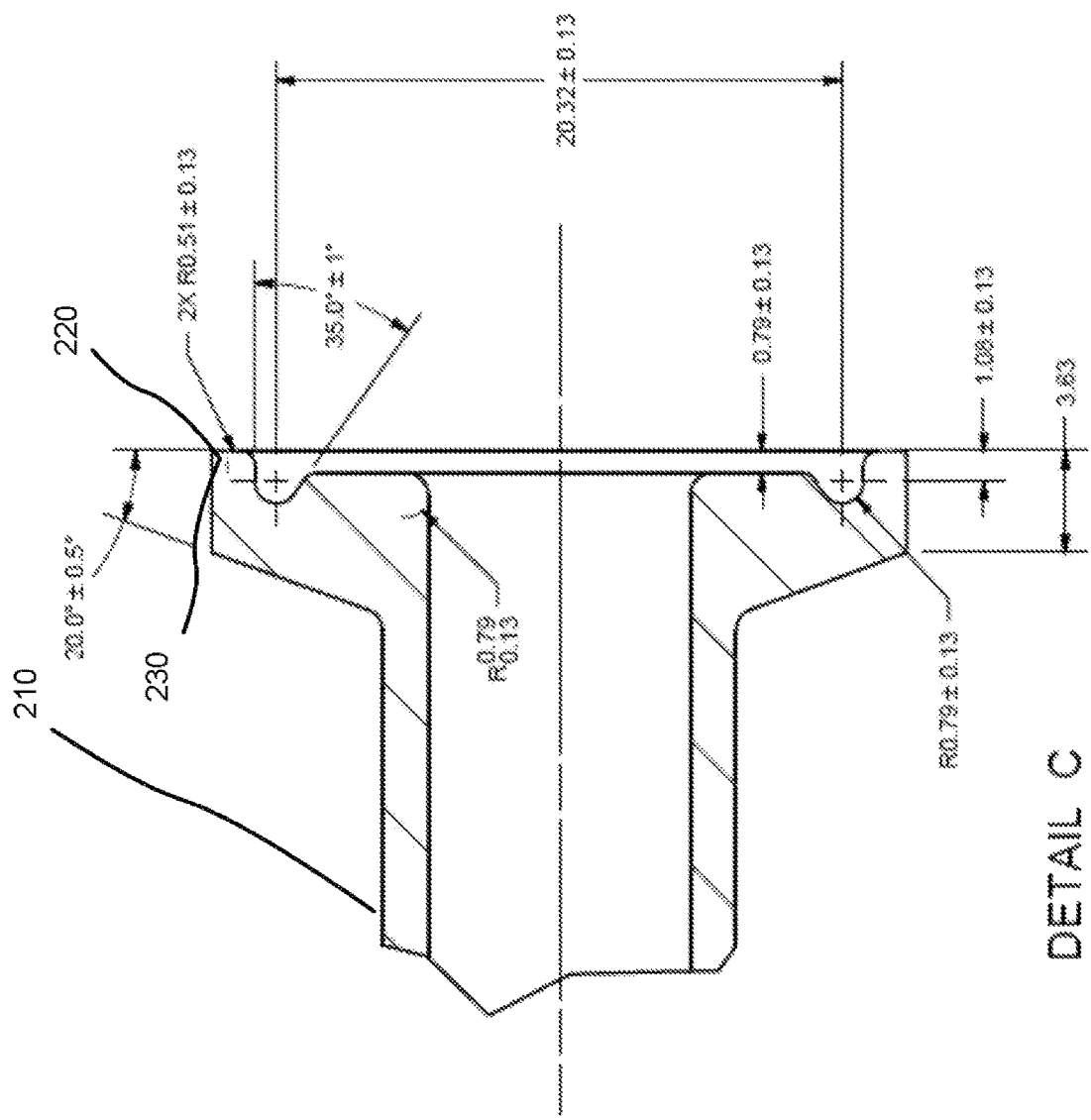
FIG. 2F depicts a flow cell in accordance with an exemplary embodiment.
Figure 2G:
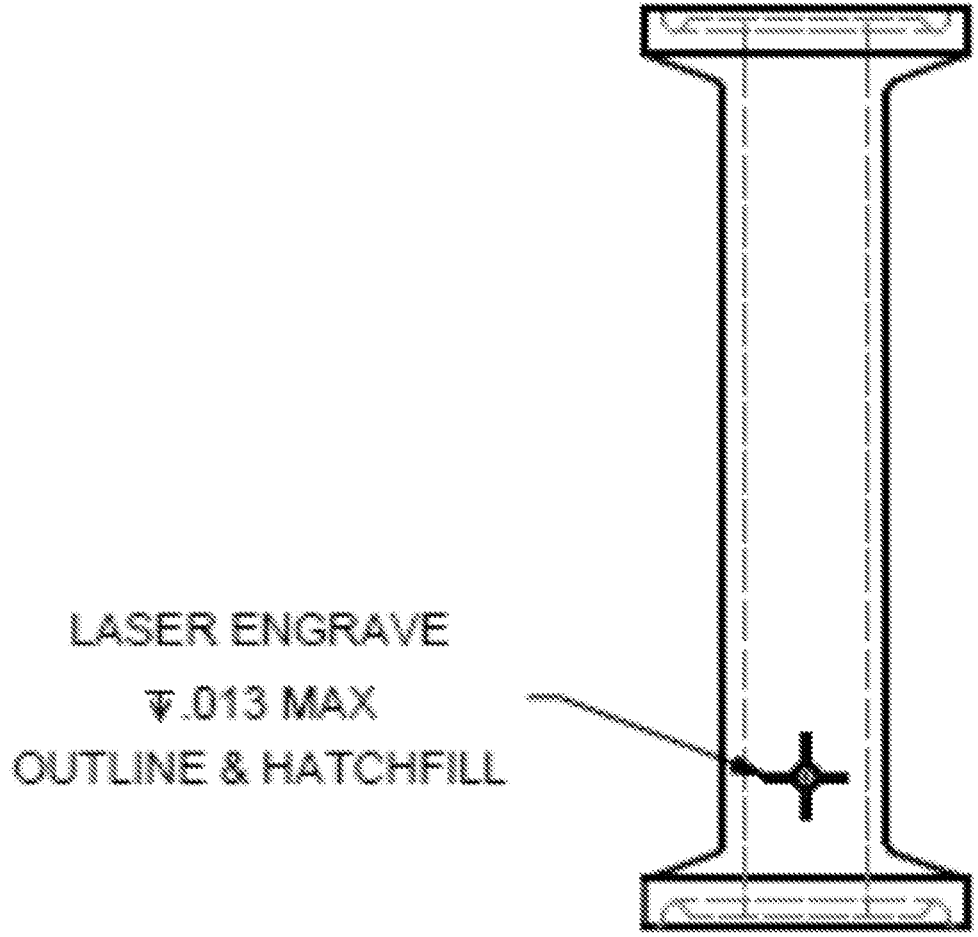
FIG. 2G depicts a flow cell in accordance with an exemplary embodiment.
Figure 3:
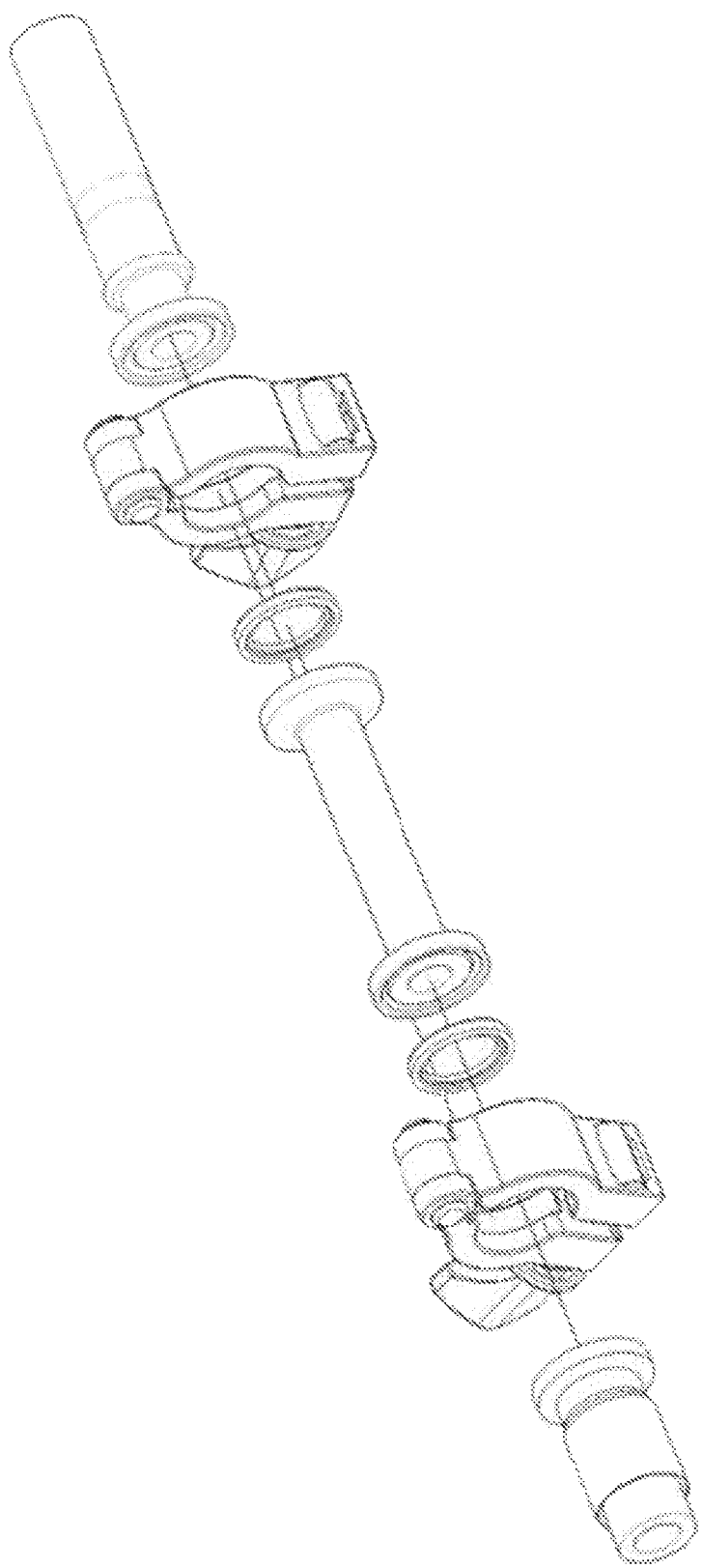
FIG. 3 depicts a flow cell in accordance with an exemplary embodiment.
Figure 4A:
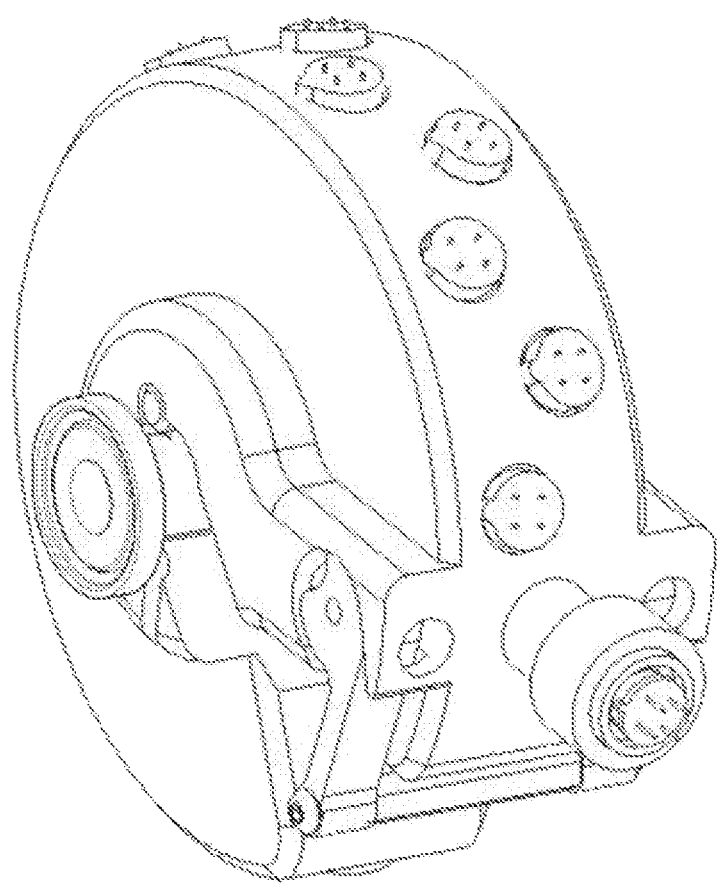
FIG. 4A depicts a read head in accordance with an exemplary embodiment.
Figure 4B:
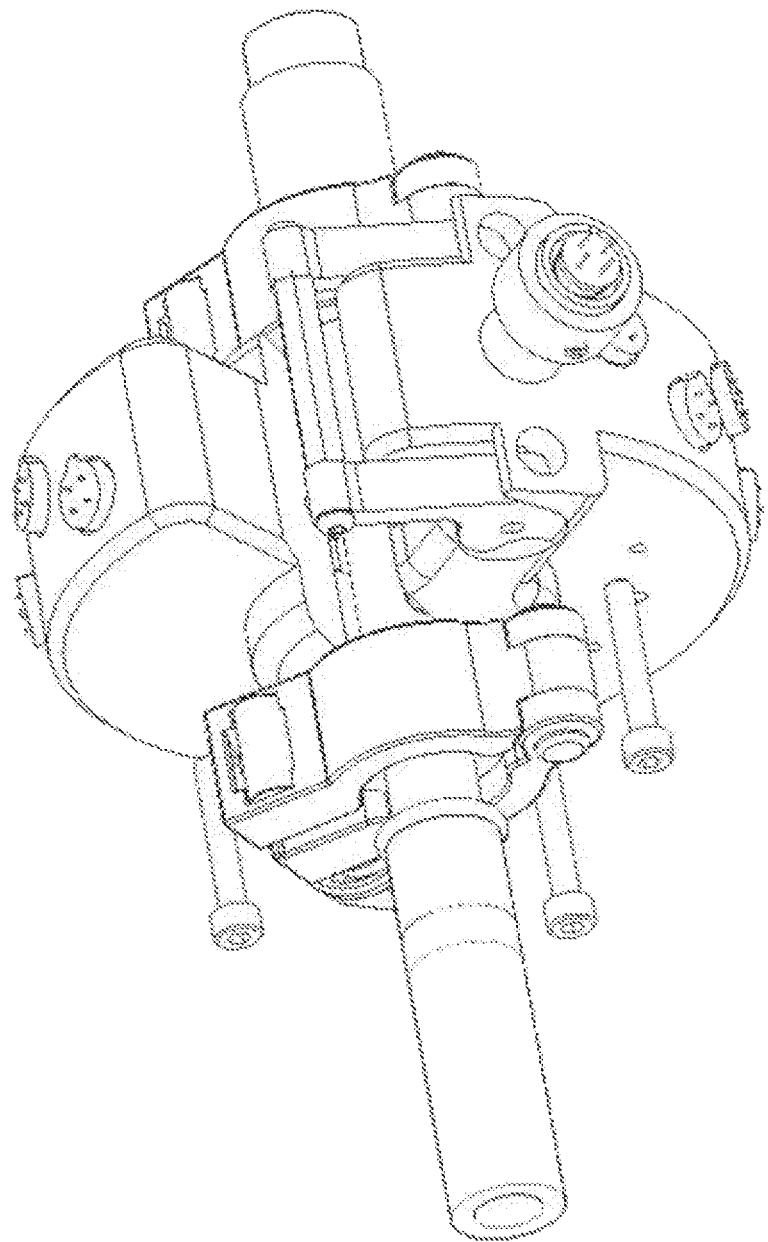
FIG. 4B depicts a read head in accordance with an exemplary embodiment.
Figure 4C:
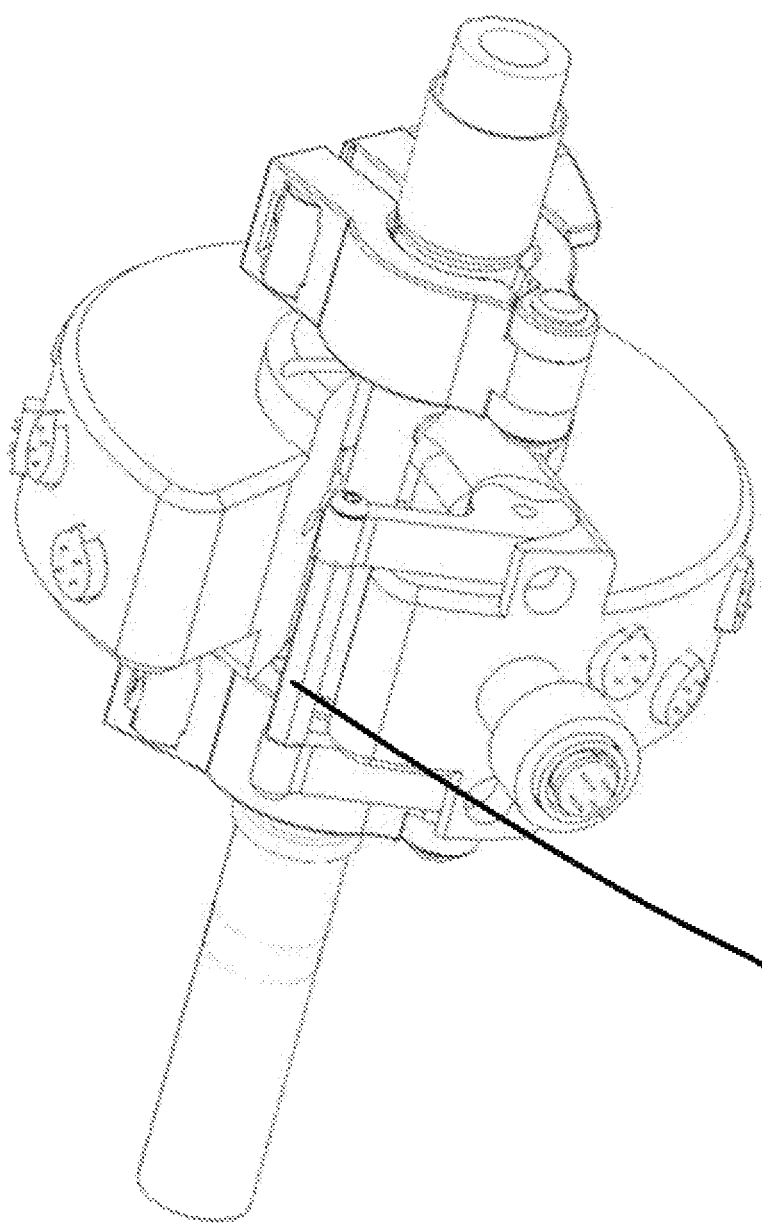
FIG. 4C depicts a read head in accordance with an exemplary embodiment.
Figure 4D:
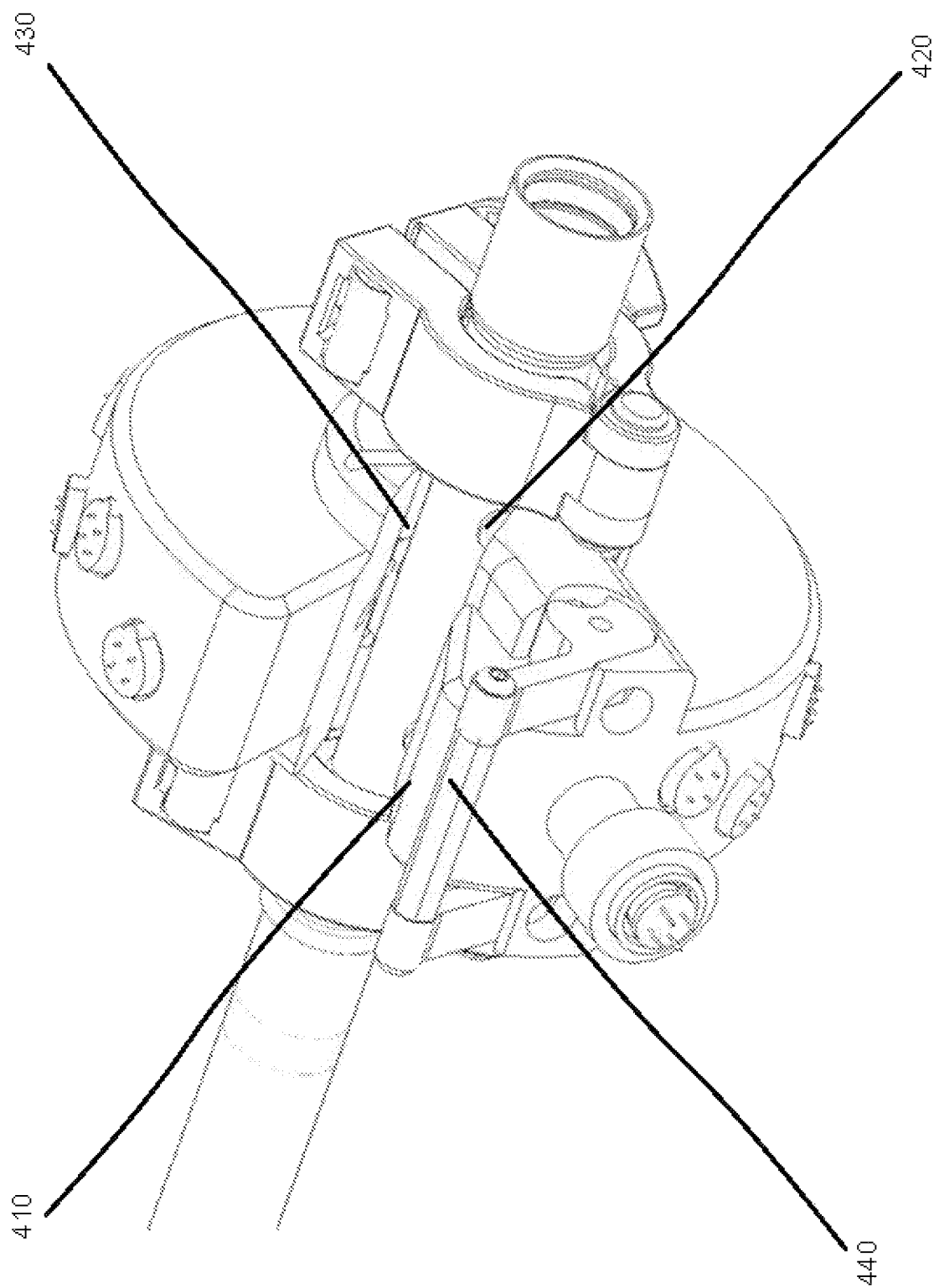
FIG. 4D depicts a read head in accordance with an exemplary embodiment.
Figure 4E:
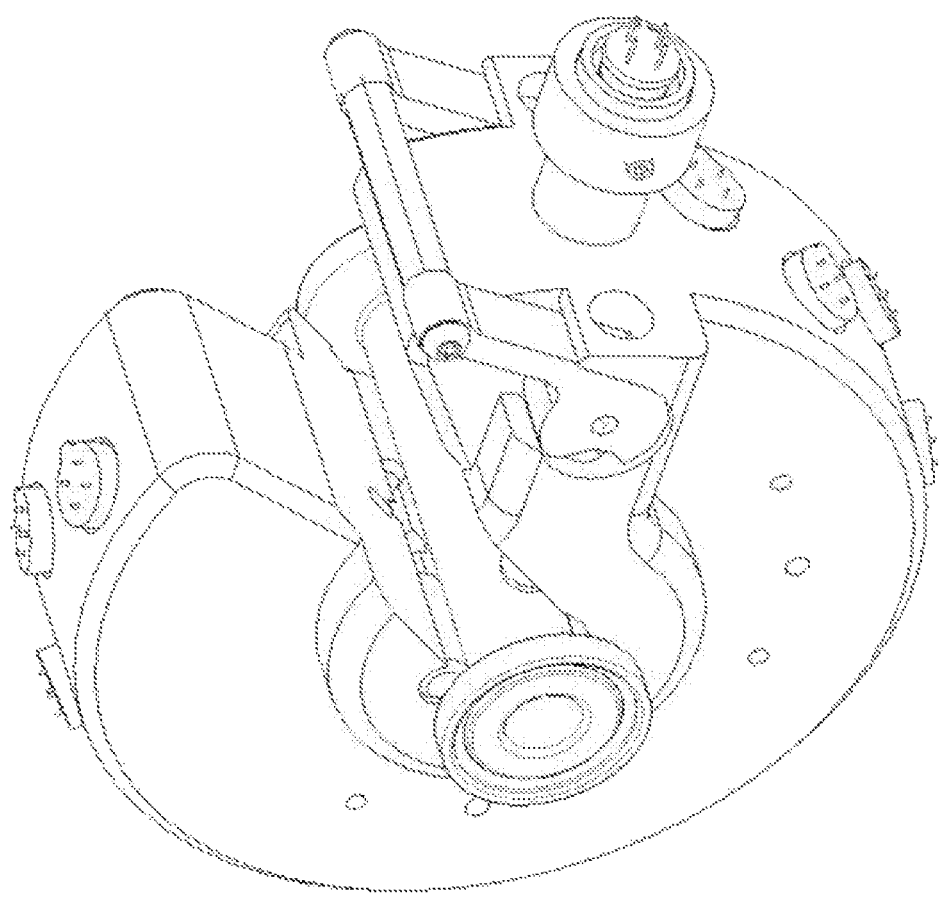
FIG. 4E depicts a read head in accordance with an exemplary embodiment.
Figure 4F:
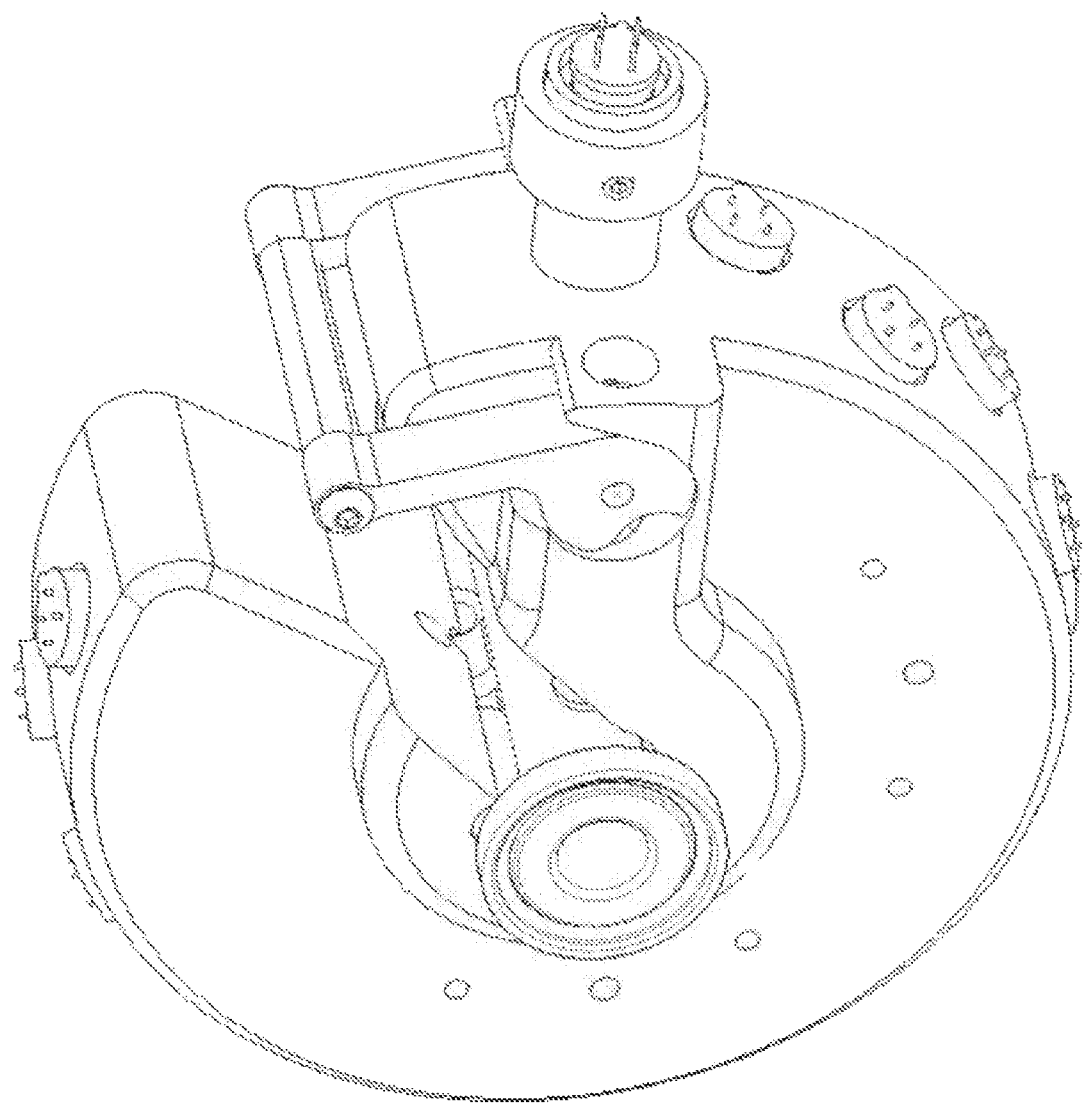
FIG. 4F depicts a read head in accordance with an exemplary embodiment.
Figure 4G:
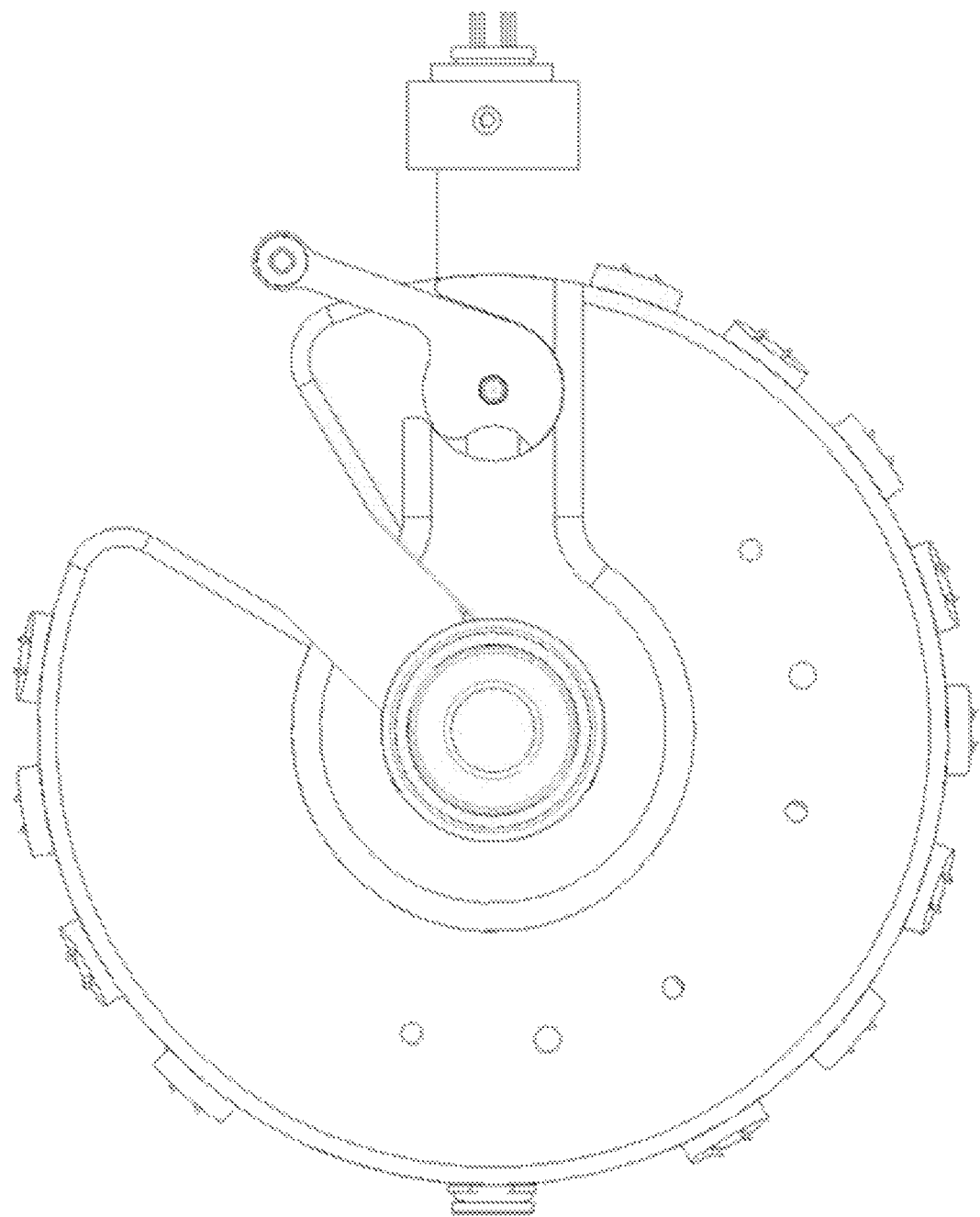
FIG. 4G depicts a read head in accordance with an exemplary embodiment.
Figure 4H:
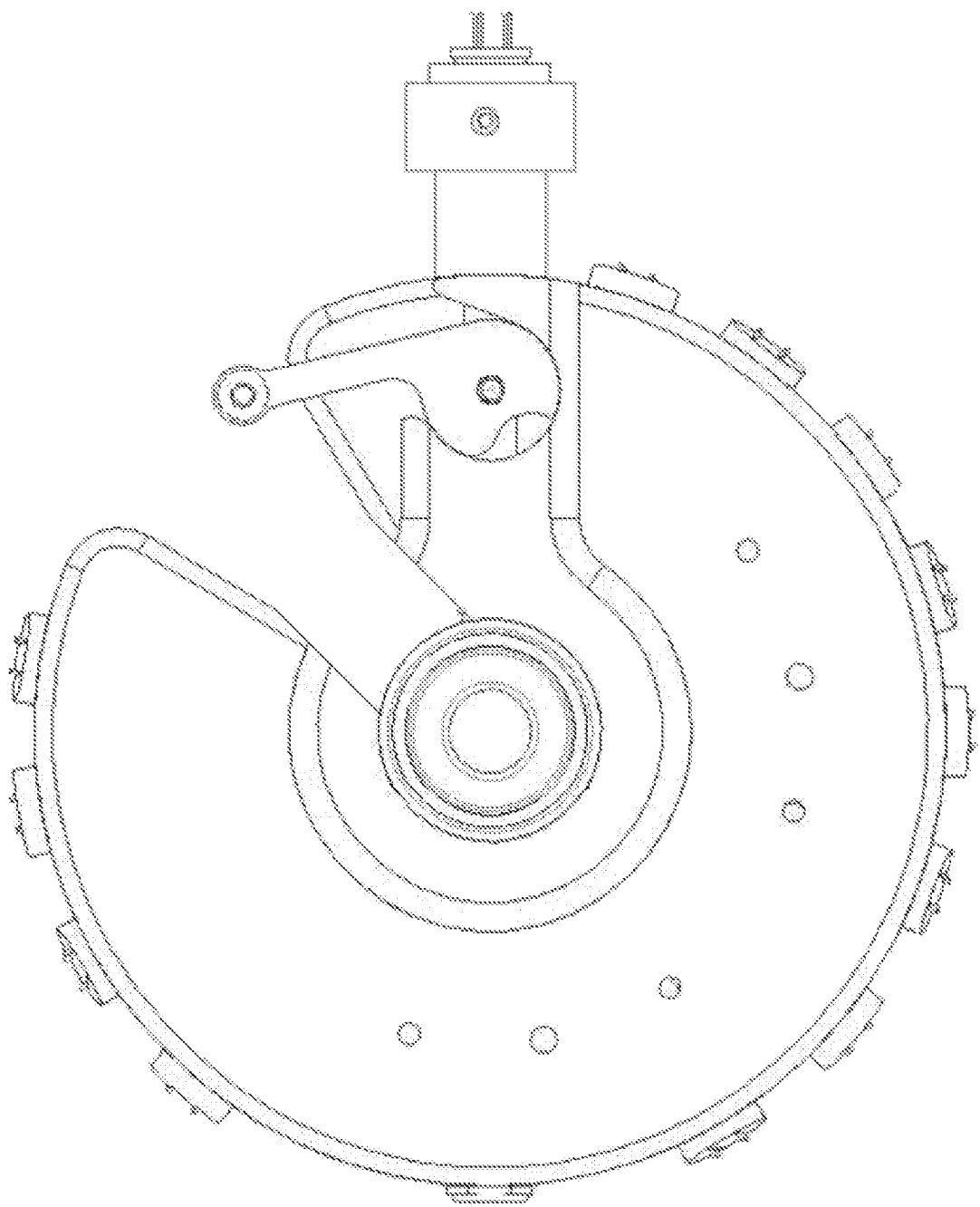
FIG. 4H depicts a read head in accordance with an exemplary embodiment.
Figure 4I:
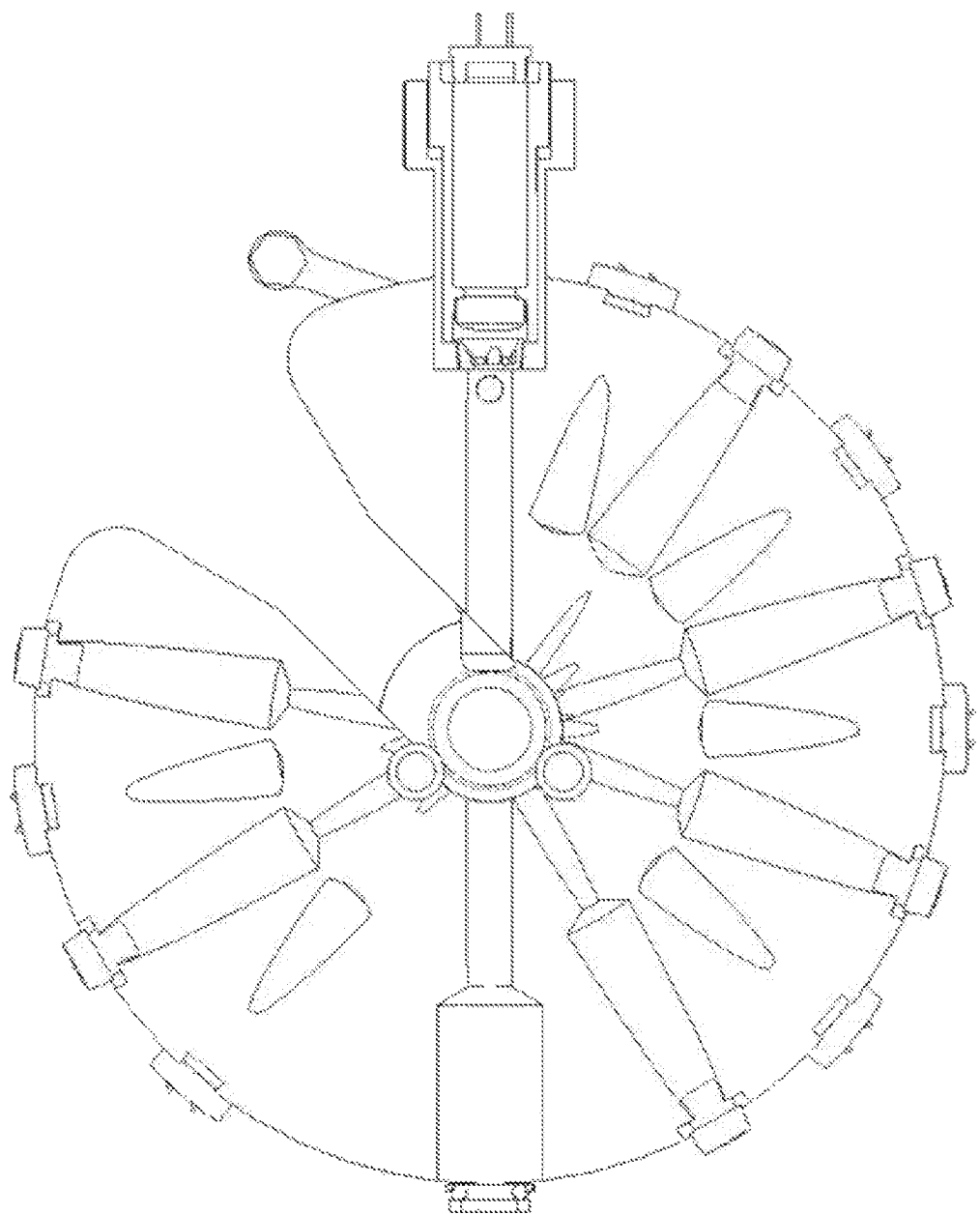
FIG. 4I depicts a read head in accordance with an exemplary embodiment.
Figure 4J:
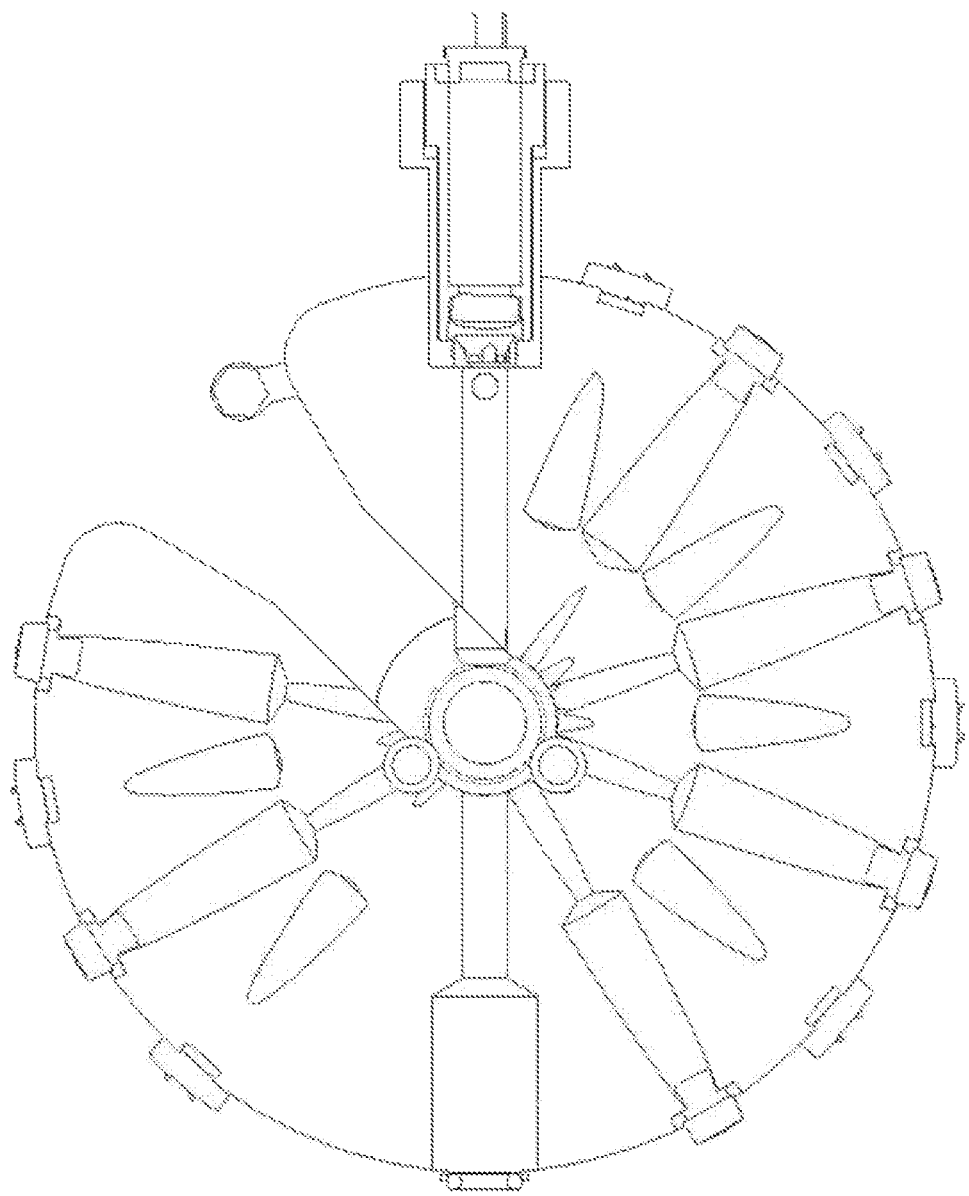
FIG. 4J depicts a read head in accordance with an exemplary embodiment
Figure 5A:
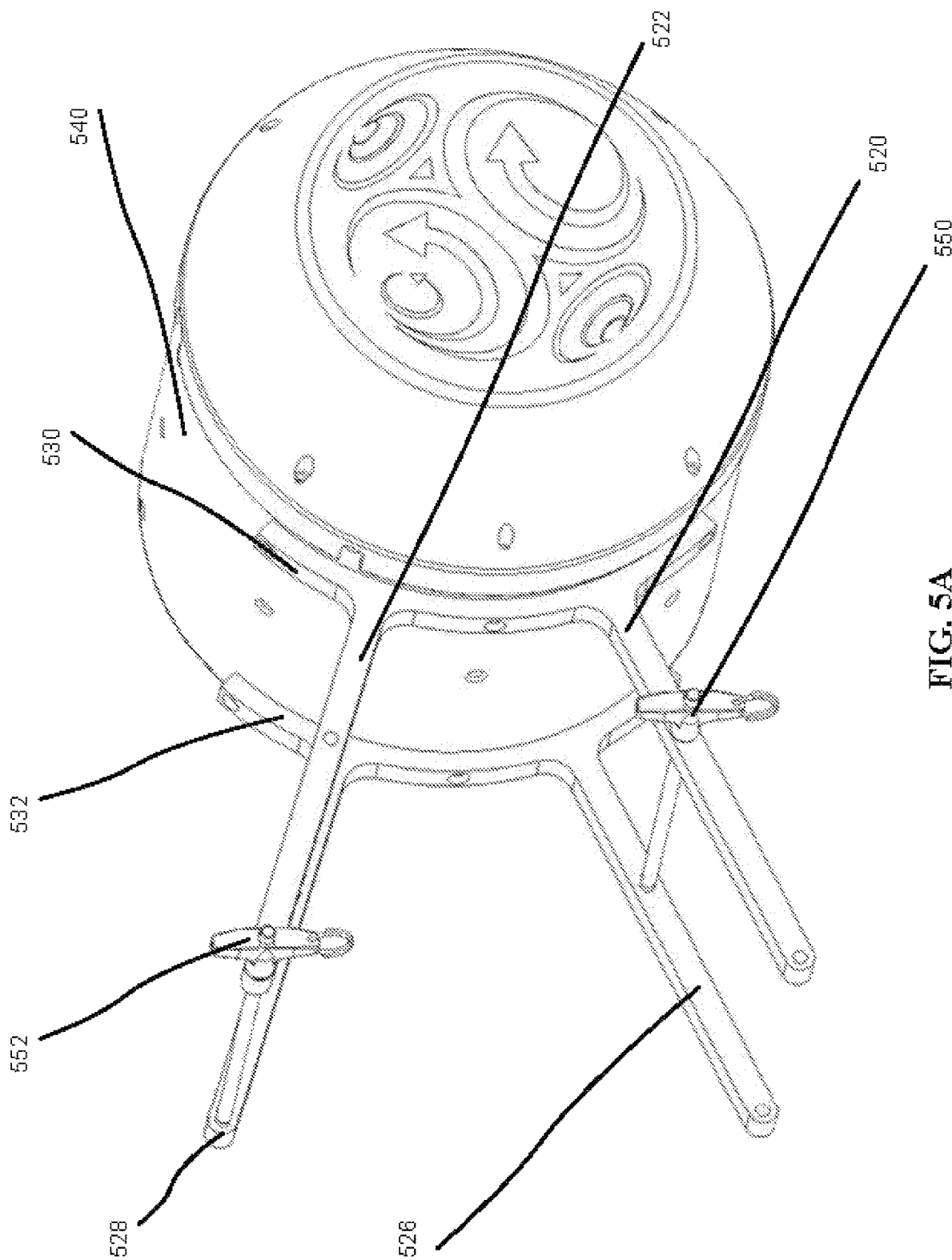
FIG. 5A depicts a skid attachment in accordance with an exemplary embodiment.
Figure 5B:
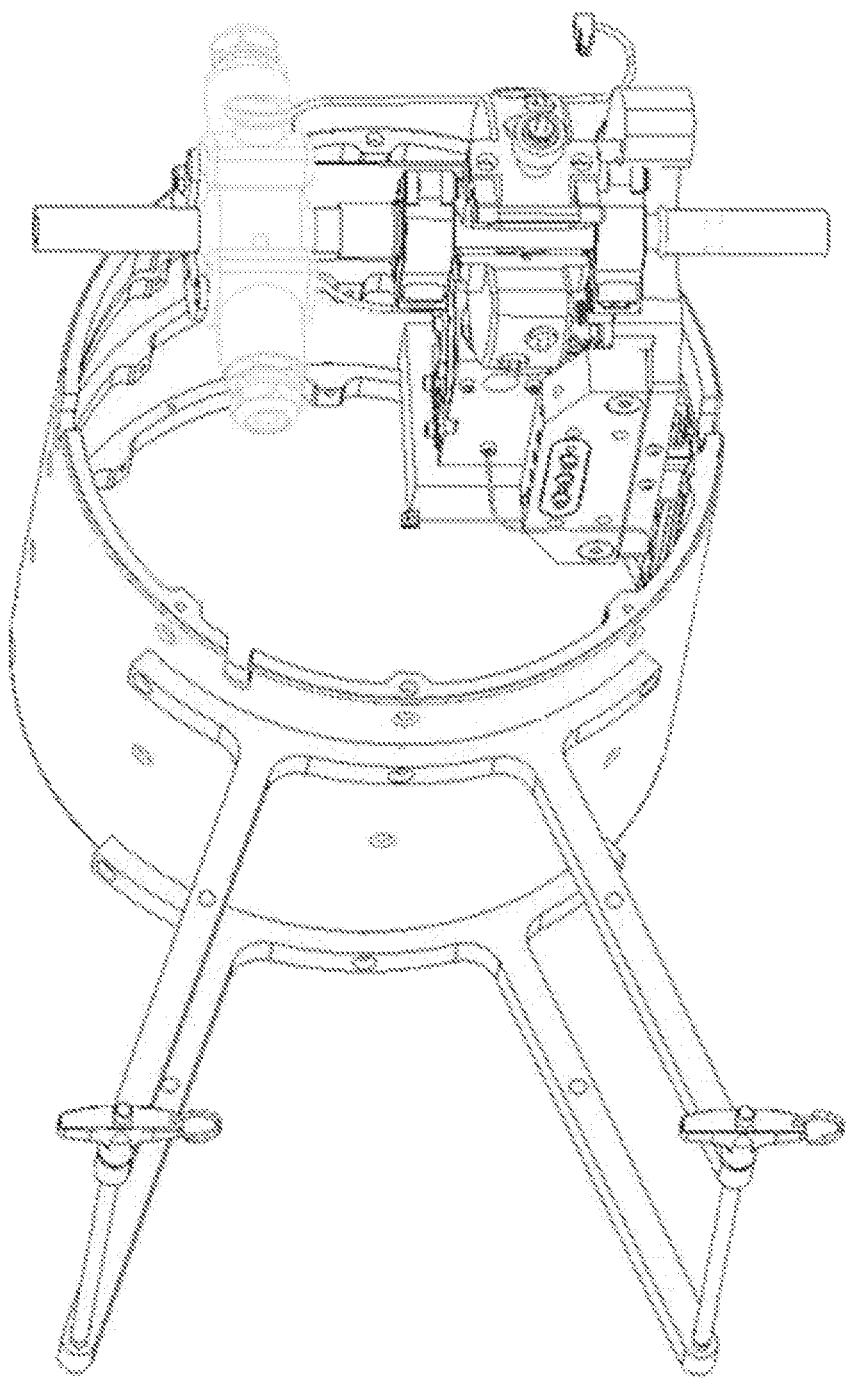
FIG. 5B depicts a skid attachment in accordance with an exemplary embodiment.
Figure 5C:
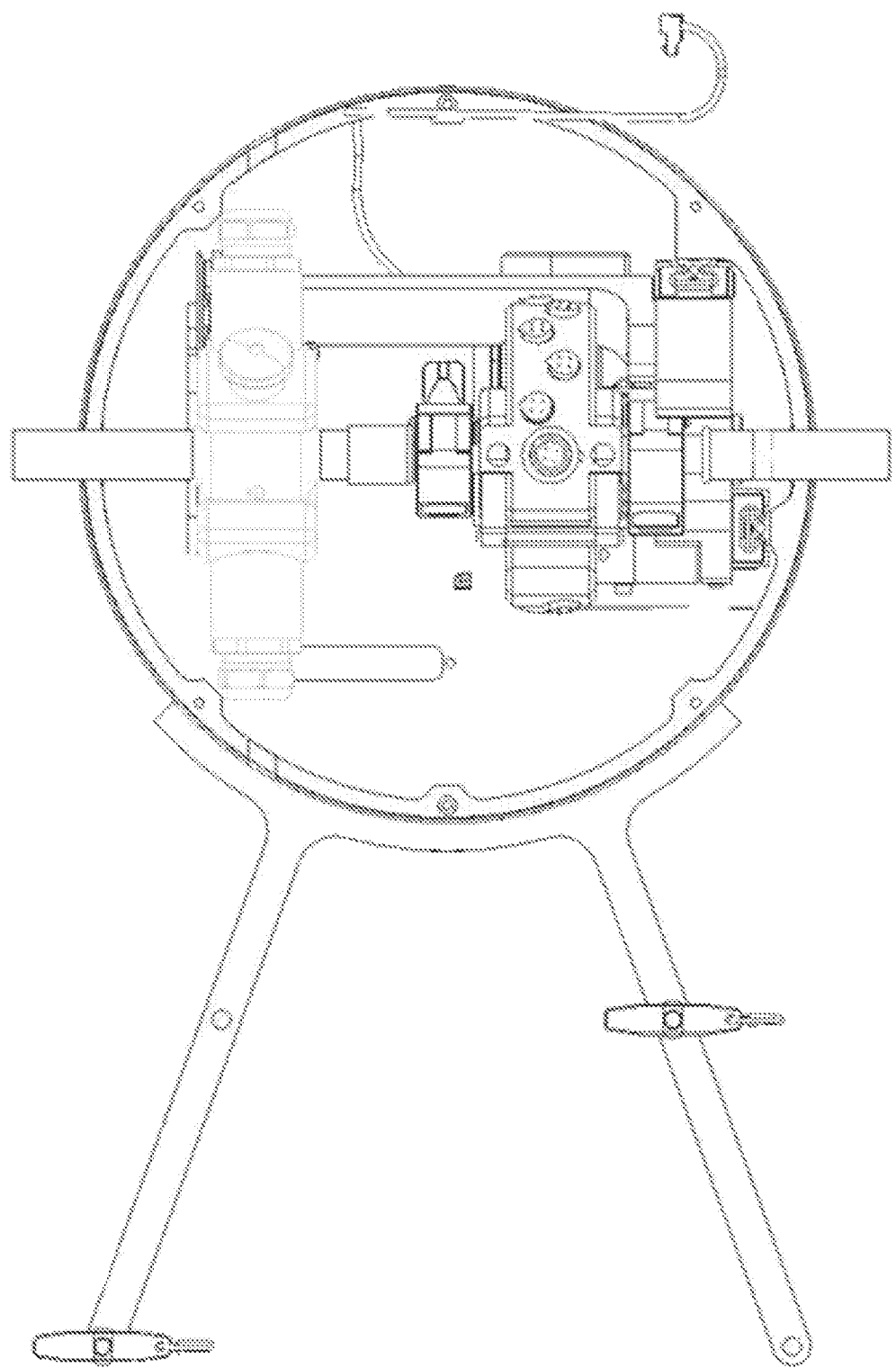
FIG. 5C depicts a skid attachment in accordance with an exemplary embodiment.
Figure 6A:
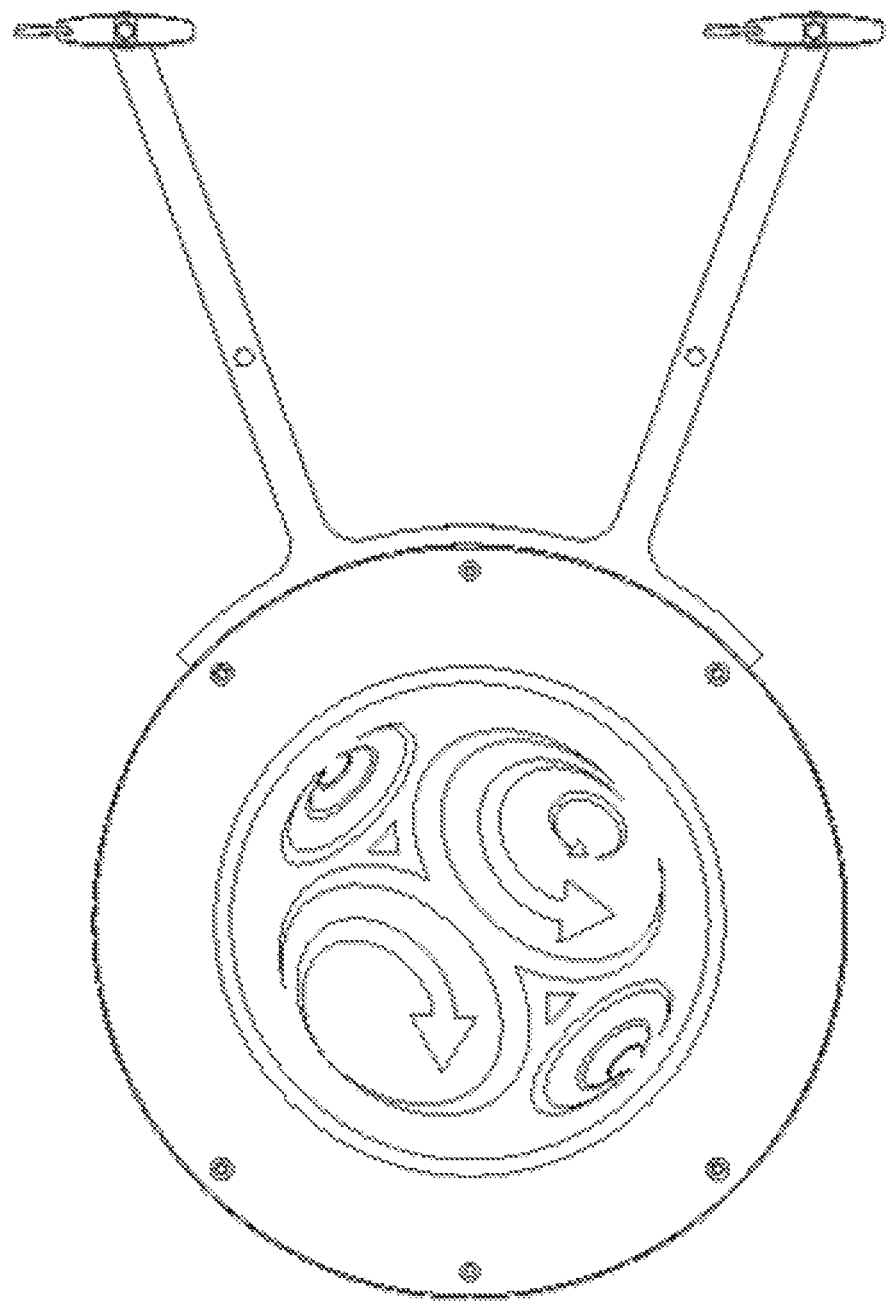
FIG. 6A depicts a skid attachment in accordance with an exemplary embodiment.
Figure 6B:
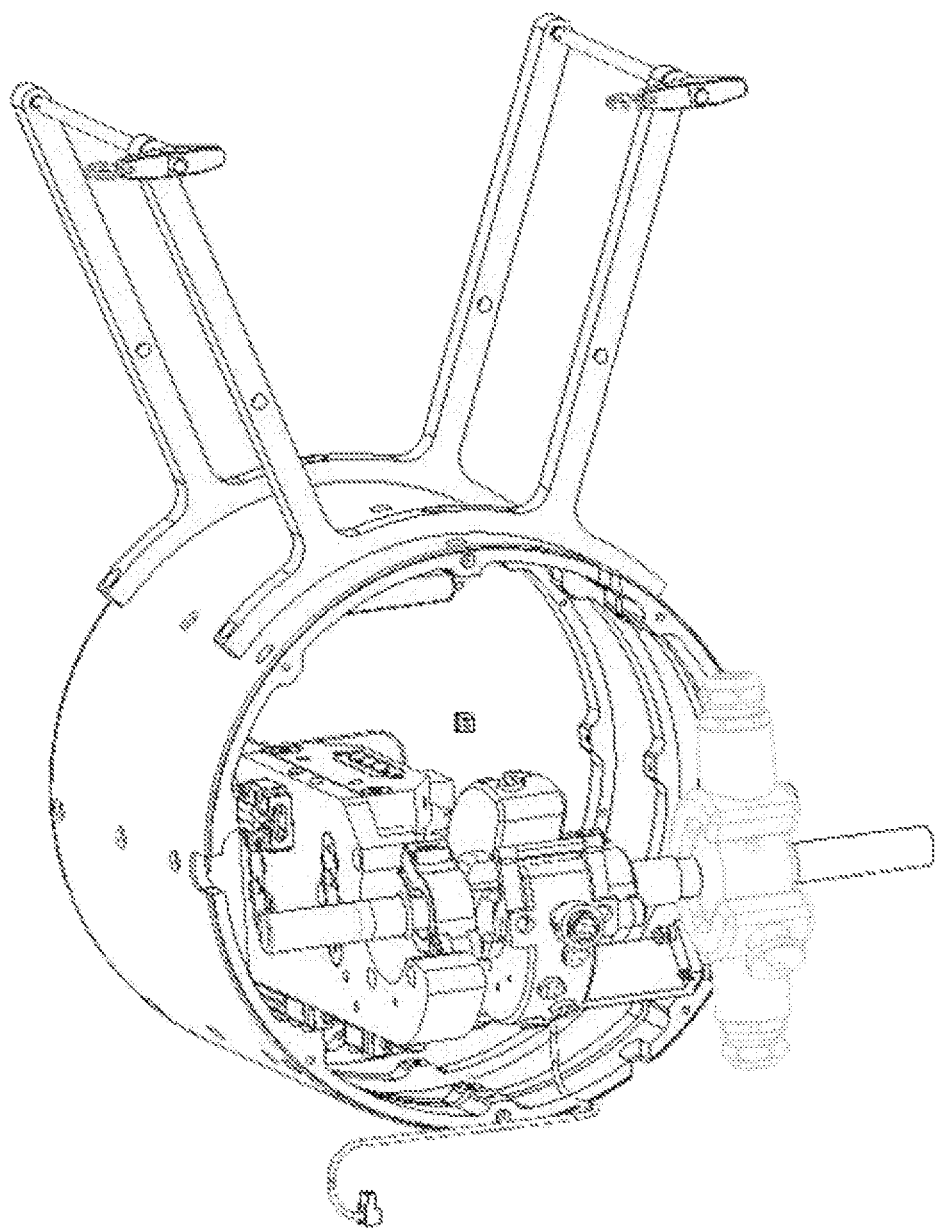
FIG. 6B depicts a skid attachment in accordance with an exemplary embodiment.
Figure 6C:
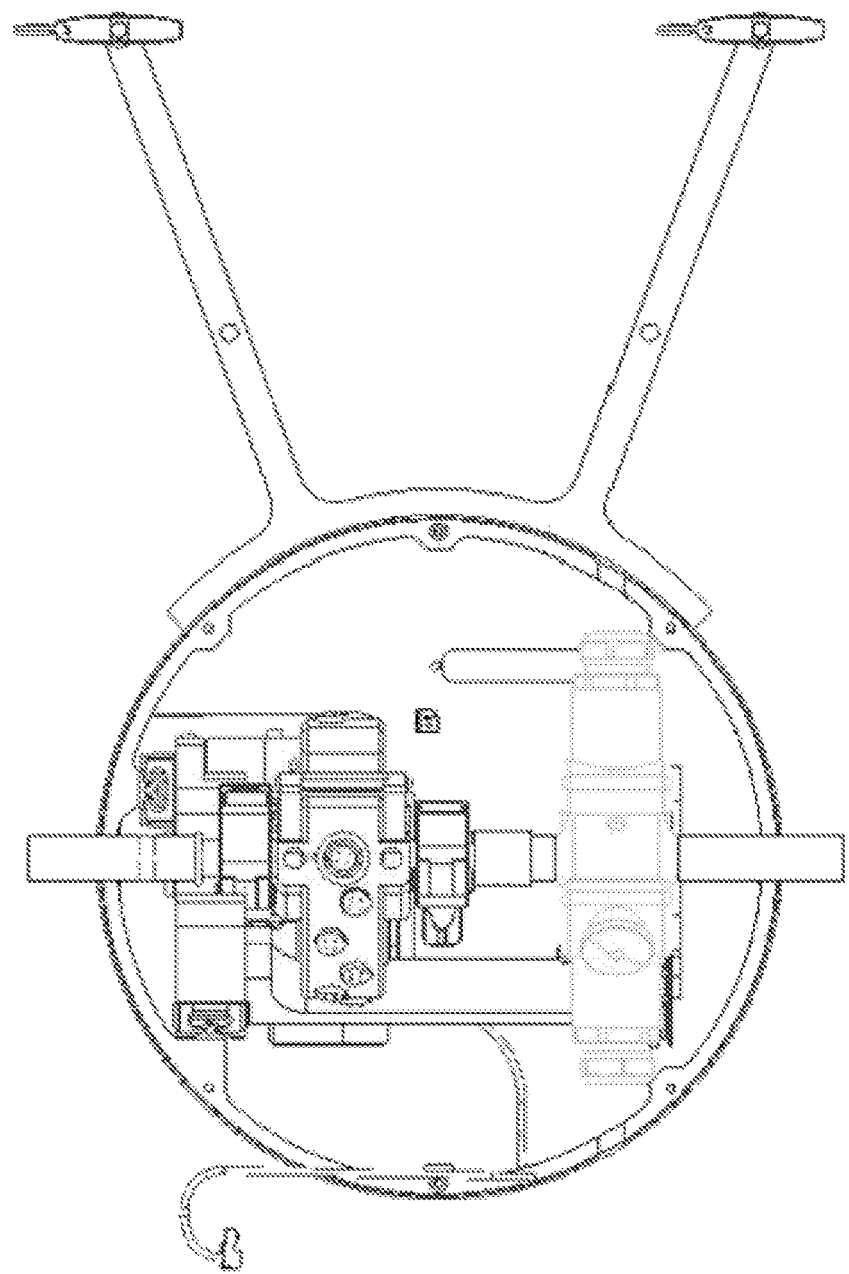
FIG. 6C depicts a skid attachment in accordance with an exemplary embodiment.
Figure 7A:
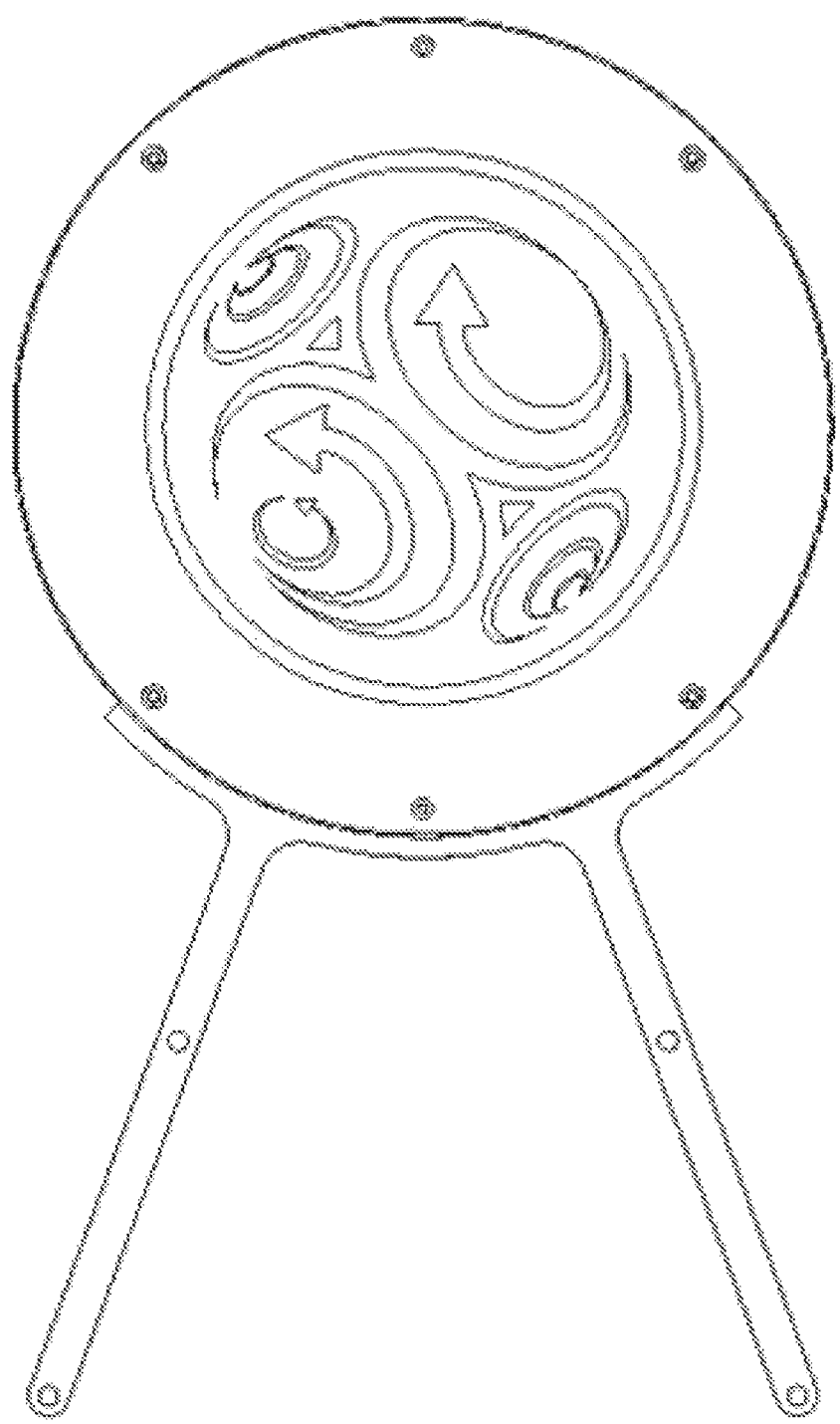
FIG. 7A depicts a skid attachment in accordance with an exemplary embodiment.
Figure 7B:
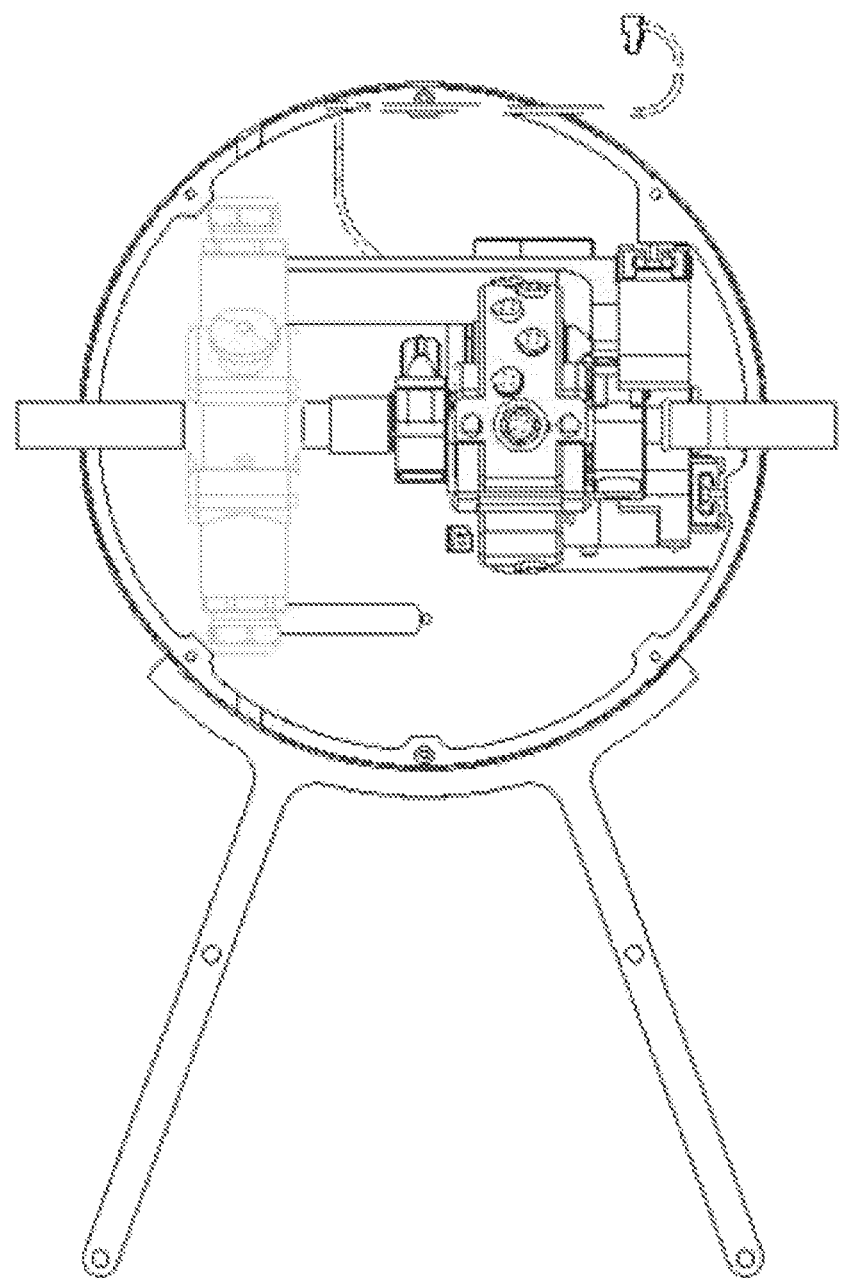
FIG. 7B depicts a skid attachment in accordance with an exemplary embodiment.
Figure 7C:
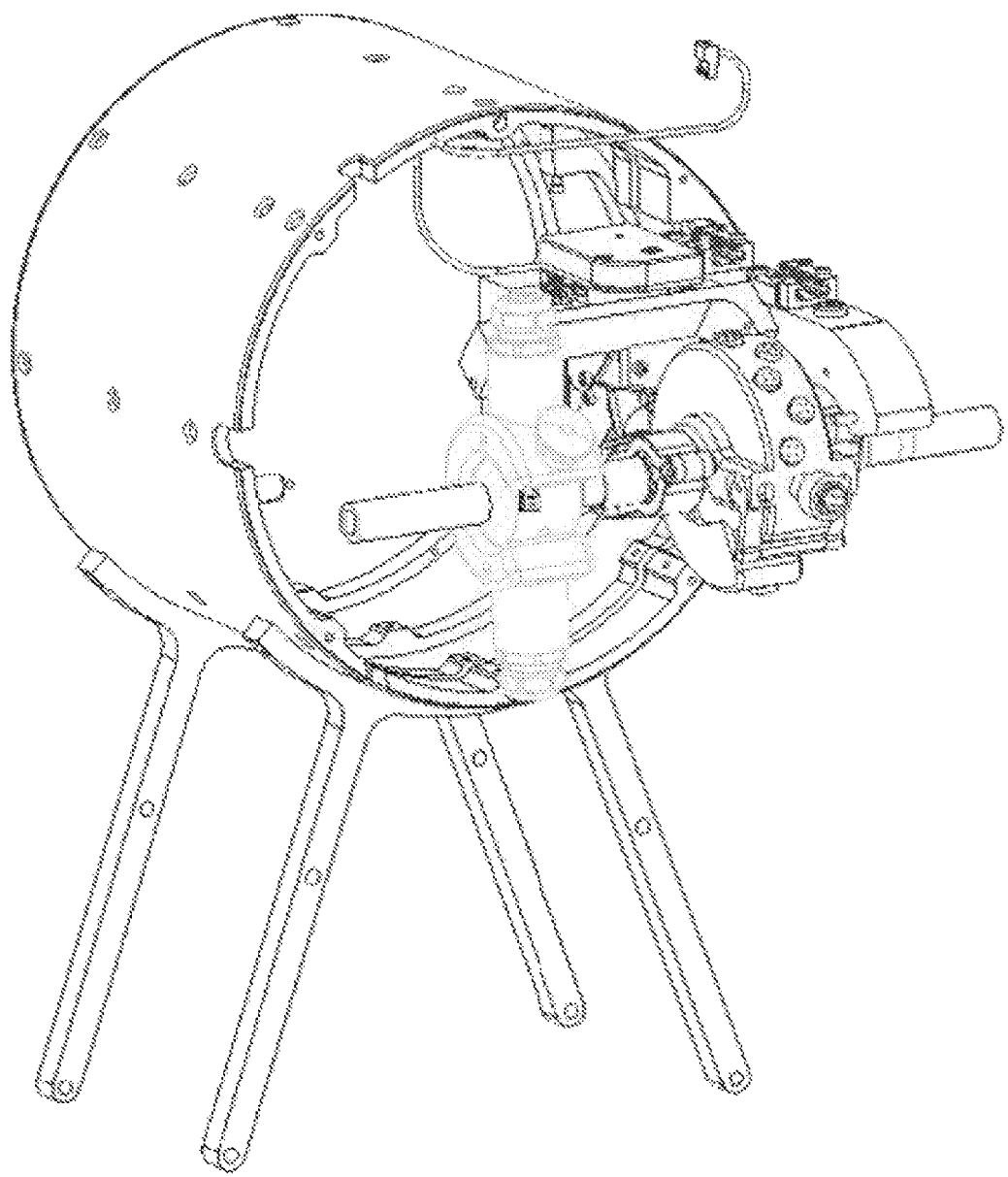
FIG. 7C depicts a skid attachment in accordance with an exemplary embodiment.

The present disclosure describes a flow cell, a read head, and a skid attachment for measuring real-time molecular weight for downstream process control. In an exemplary embodiment, the flow cell comprises (1) a hollow cylindrical tube, (2) an inlet flange connected to an inlet of the tube, and (3) an outlet flange connected to an outlet of the tube. In an exemplary embodiment, the read head comprises (1) at least one push rod, (2) at least two line contacts, where the at least one push rod is configured to push an outer side wall of a flow cell against the at least two line contacts, thereby registering the flow cell within the read head. In an exemplary embodiment, the skid attachment comprises a plurality of arms connected to an enclosure configured to house at least a multi-angle light scattering instrument comprising a read head, where the enclosure is configured to be connected to a skid via the plurality of arms, where the skid is configured to house chemical processing equipment.

Flow Cell

In an exemplary embodiment, the flow cell is depicted in FIG. 2A, FIG. 2B, FIG. 2C, FIG. 2D, FIG. 2E, FIG. 2F, FIG. 2G, and FIG. 3. Referring to in FIG. 2A, FIG. 2B, FIG. 2C, FIG. 2D, FIG. 2E, FIG. 2F, FIG. 2G, in an exemplary embodiment, the flow cell includes a hollow cylindrical tube 210, an inlet flange 220 connected to an inlet 212 of tube 210, and an outlet flange 230 connected to an outlet 214 of tube 210. In an embodiment, tube 210 includes an orientation indicator 240 configured to allow the flow cell to be positioned within a read head.

In an embodiment, tube 210, inlet flange 220, and outlet flange 230 include an optically clear material. In a particular embodiment, tube 210, inlet flange 220, and outlet flange 230 are an optically clear material. In an embodiment, tube 210, inlet flange 220, and outlet flange 230 include a material with the optical qualities, the chemical resistivity, and the strength of fused quartz. In a particular embodiment, tube 210, inlet flange 220, and outlet flange 230 are a material with the optical qualities, the chemical resistivity, and the strength of fused quartz. In an embodiment, the material is one of fused silica, sapphire, borosilicate, Schott N-K5 glass, and fused quartz. In an embodiment, tube 210, inlet flange 220, and outlet flange 230 include fused quartz.

In a particular embodiment, tube 210, inlet flange 220, and outlet flange 230 are fused quartz.

In an embodiment, tube 210, inlet flange 220, and outlet flange 230 include a material with at least the Young's modulus of fused silica, at least the tensile strength of fused silica, at least the sheer strength of fused silica, and at least the yield strength of fused silica. In a particular embodiment, tube 210, inlet flange 220, and outlet flange 230 are a material with at least the Young's modulus of fused silica, at least the tensile strength of fused silica, at least the sheer strength of fused silica, and at least the yield strength of fused silica.

In an embodiment, tube 210 has a concentricity of less than 0.13. In a particular embodiment, tube 210 has a concentricity greater than or equal to 0.05 and less than or equal to 0.07. In an embodiment, tube 210, inlet flange 220, and outlet flange 230 have a scratch dig between 10-5 and 20-10.

In an embodiment, tube 210, inlet flange 220, and outlet flange 230 are compatible with industry standard sanitary tri-clamp fittings. In an embodiment, tube 210, inlet flange 220, and outlet flange 230 are gamma-sterilizable. In an embodiment, tube 210, inlet flange 220, and outlet flange 230 are disposable. In an embodiment, tube 210, inlet flange 220, and outlet flange 230 are compatible with a volume flow rate of greater than or equal to 20 L/minute.

Read Head

In an exemplary embodiment, the read head is depicted in FIG. 4A, FIG. 4B, FIG. 4C, FIG. 4D, FIG. 4E, FIG. 4F, FIG. 4G, FIG. 4H, FIG. 4I, and FIG. 4J.

Referring to in FIG. 4A, FIG. 4B, FIG. 4C, FIG. 4D, FIG. 4E, FIG. 4F, FIG. 4G, FIG. 4H, FIG. 4I, and FIG. 4J, in an exemplary embodiment, the read head includes at least one push rod 410, at least two line contacts 420, 430, and where at least one push rod 410 is configured to push an outer side wall of a flow cell against at least two line contacts 420, 430, thereby registering the flow cell within the read head. In an embodiment, the read head is configured to hold the flow cell in a flow cell holder, where the flow cell and the flow cell holder are concentric.

In a further embodiment, the read head further includes a lever 440 connected to push rod 410, where lever 440 is configured to be moved in a first direction to move push rod 410 to push the outer side wall of the flow cell against at least two line contacts 420, 430, thereby registering the flow cell within the read head, and where lever 440 is configured to be moved in a second direction to move push rod 410 away from the outer side wall of the flow cell, thereby releasing the flow cell from at least two line contacts 420, 430, thereby releasing the flow cell from the read head. In an embodiment, each of at least two line contacts 420, 430 include a first line contact piece; and a second line contact piece in line with the first line contact piece and separated from the first line contact piece by a distance. In a particular embodiment, the distance is at least 0.5 in. In an embodiment, a spring, a cam, a hydraulic press, an electric servo motor, a pneumatic press, or a screw is connected to push rod 410, where the spring, the cam, the hydraulic press, the electric servo motor, the pneumatic press, or the screw is configured to be moved in a first direction to move push rod 410 to push the outer side wall of the flow cell against at least two line contacts 420, 430, thereby registering the flow cell within the read head, and where the spring, the cam, the hydraulic press, the electric servo motor, the pneumatic press, or the screw is configured to be moved in a second direction to move push rod 410 away from the outer side wall of the flow cell, thereby releasing the flow cell from at least two line contacts 420, 430, thereby releasing the flow cell from the read head. Registering the flow cell within the read head could allow for more accurate measurements from the flow cell.

In an exemplary embodiment, the read head includes at least one push rod, at least three point contacts, and where the at least one push rod is configured to push an outer side wall of a flow cell against the at least three point contacts, thereby registering the flow cell within the read head. In a further embodiment, a read head further includes a lever connected to the push rod, where the lever is configured to be moved in a first direction to move the push rod to push the outer side wall of the flow cell against the at least three point contacts, thereby registering the flow cell within the read head, and where the lever is configured to be moved in a second direction to move the push rod away from the outer side wall of the flow cell, thereby releasing the flow cell from the at least three point contacts, thereby releasing the flow cell from the read head.

Skid Attachment

In an exemplary embodiment, the skid attachment is depicted in FIG. 5A, FIG. 5B, FIG. 5C, FIG. 6A, FIG. 6B, FIG. 6C, FIG. 7A, FIG. 7B, and FIG. 7C. Referring to in FIG. 5A, FIG. 5B, FIG. 5C, FIG. 6A, FIG. 6B, FIG. 6C, FIG. 7A, FIG. 7B, and FIG. 7C, in an exemplary embodiment, the skid attachment includes a plurality of arms connected to an enclosure 540 configured to house at least a multi-angle light scattering instrument comprising a read head. In an embodiment, the plurality of arms include at least four arms.

In a particular embodiment, the plurality of arms include at least two sets of arms 512, 516 wherein each of at least two sets of arms 512, 516 includes two arms 520, 522, 526, 528 connected to an enclosure holder 530, 532 configured to be connected to enclosure 540.

In an embodiment, enclosure 540 is configured to be connected to a skid via the plurality of arms. In an embodiment, the skid is configured to house chemical processing equipment.

In a further embodiment, the plurality of arms further include at least two pins 550, 552, where at least two pins 550, 552 are configured to couple together at least two sets of arms thereby connecting the plurality of arms and enclosure 540 to the skid.

EXAMPLE

Figure 8:
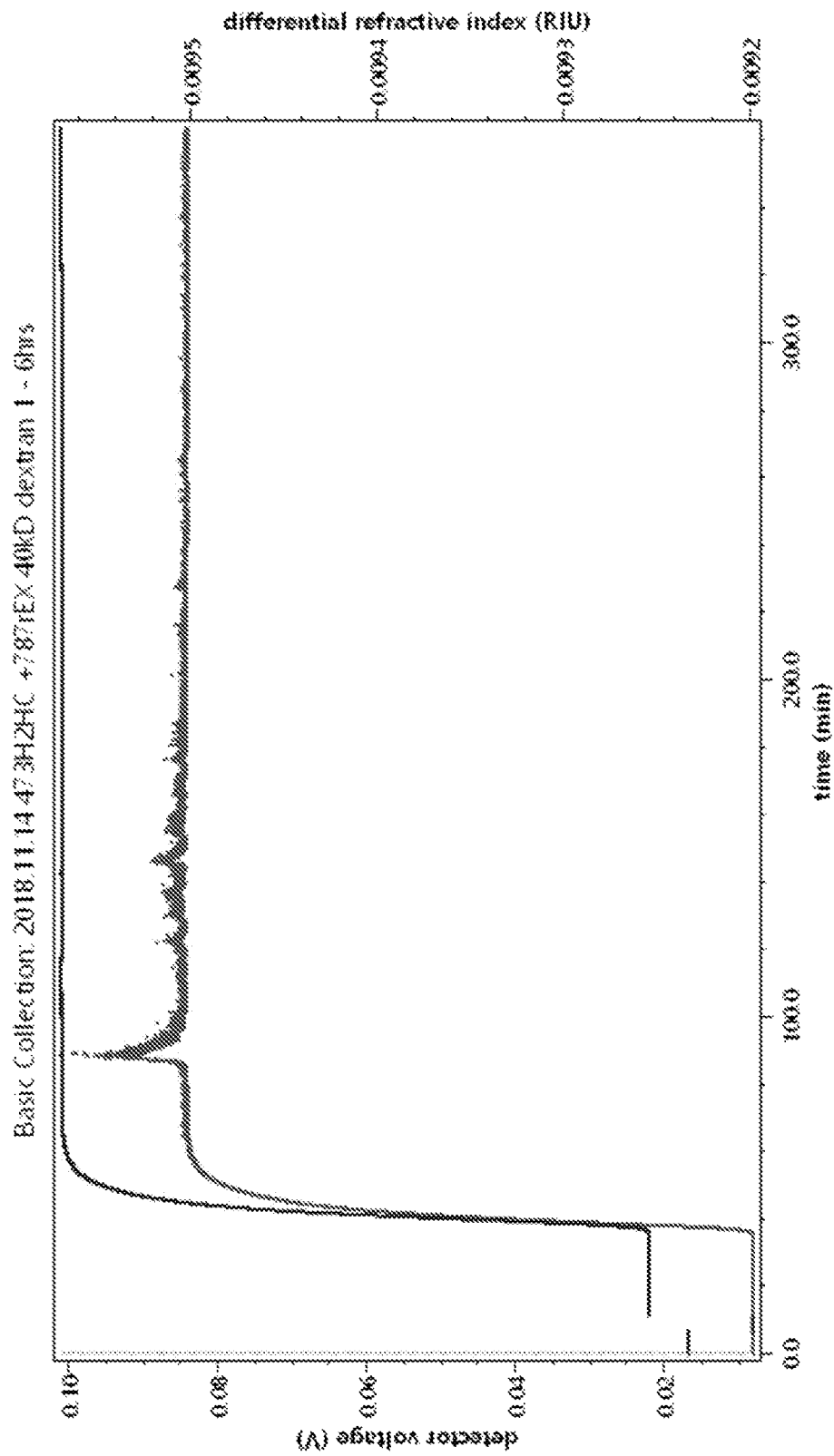
FIG. 8 depicts a graph in accordance with an embodiment

As an example, FIG. 8 depicts the performance of the flow cell when connected to chemical processing equipment.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A device comprising a flow cell and a read head: a flow cell further comprising
   a hollow cylindrical tube;
   an inlet flange connected to an inlet of the tube;
   an outlet flange connected to an outlet of the tube;

wherein at least one push rod of a read head is configured to push an outer side wall of the flow cell against at least two line contacts of the read head, thereby registering the flow cell within the read head; and wherein the read head further comprises a lever connected to the push rod, wherein the lever is configured to be moved in a first direction to move the push rod to push the outer side wall of the flow cell against the at least two line contacts, thereby registering the flow cell within the read head, and wherein the lever is configured to be moved in a second direction to move the push rod away from the outer side wall of the flow cell, thereby releasing the flow cell from the at least two line contacts, thereby releasing the flow cell from the read head.

2. The device of claim 1 wherein the tube, the inlet flange, and the outlet flange comprise an optically clear material.

3. The device of claim 2 wherein the material is one of fused silica, sapphire, borosilicate, Schott N-K5 glass, and fused quartz.

4. The device of claim 1 wherein the tube, the inlet flange, and the outlet flange comprise a material with the optical qualities, the chemical resistivity, and the strength of fused quartz.

5. The device of claim 1 wherein the tube has a concentricity of less than 0.13.

6. The device of claim 5 wherein the tube has a concentricity greater than or equal to 0.05 and less than or equal to 0.07.

7. The device of claim 1 wherein the tube, the inlet flange, and the outlet flange have a scratch dig between 10-5 and 20-10.

8. The device of claim 1 wherein the tube, the inlet flange, and the outlet flange are compatible with industry standard sanitary tri-clamp fittings.

9. The device of claim 1 wherein the tube, the inlet flange, and the outlet flange are compatible with a volume flow rate of greater than or equal to 20 L/minute.

10. The device of claim 1 wherein the tube comprises an orientation indicator configured to allow the flow cell to be positioned within a read head.

\* \* \* \* \*